United States Patent
Hatanaka et al.

(10) Patent No.: US 7,383,446 B1
(45) Date of Patent: Jun. 3, 2008

(54) RECORDING DEVICE

(75) Inventors: Masayuki Hatanaka, Kawasaki (JP); Jun Kamada, Kawasaki (JP); Takahisa Hatakeyama, Kawasaki (JP); Takayuki Hasebe, Kawasaki (JP); Seigou Kotani, Kawasaki (JP); Tadaaki Tonegawa, Kodaira (JP); Takeaki Anazawa, Tokyo (JP); Toshiaki Hioki, Ogaki (JP); Miwa Kanamori, Ogaki (JP); Yoshihiro Hori, Gifu (JP)

(73) Assignees: Fujitsu Limited, Kawasaki (JP); Hitachi, Ltd., Tokyo (JP); Sanyo Electric Co., Ltd., Osaka (JP)

( * ) Notice: Subject to any disclaimer, the term of this patent is extended or adjusted under 35 U.S.C. 154(b) by 1077 days.

(21) Appl. No.: 10/069,113
(22) PCT Filed: Aug. 29, 2000
(86) PCT No.: PCT/JP00/05833
§ 371 (c)(1), (2), (4) Date: Jun. 24, 2002
(87) PCT Pub. No.: WO01/16820
PCT Pub. Date: Mar. 8, 2001

(30) Foreign Application Priority Data

Aug. 30, 1999 (JP) .................................. 11-243741

(51) Int. Cl.
*G06F 12/14* (2006.01)
(52) U.S. Cl. .................. 713/193; 726/27; 711/100
(58) Field of Classification Search ........ 380/200–201, 380/4–25; 705/51, 57–59; 395/200; 713/165–268; 726/26–33; 709/229, 225; 369/47.32, 178.01, 369/275.5; 711/100, 111, 152, 163
See application file for complete search history.

(56) References Cited

U.S. PATENT DOCUMENTS

| 5,191,611 A * | 3/1993 | Lang ........................... 705/53 |
| 5,392,351 A * | 2/1995 | Hasebe et al. ................ 705/51 |
| 5,694,546 A * | 12/1997 | Reisman ...................... 705/26 |
| 5,917,912 A * | 6/1999 | Ginter et al. ............... 713/187 |
| 6,055,314 A * | 4/2000 | Spies et al. ................. 380/228 |
| 6,829,592 B1 * | 12/2004 | Hasebe et al. ................ 705/51 |
| 2001/0042043 A1 * | 11/2001 | Shear et al. .................. 705/51 |

FOREIGN PATENT DOCUMENTS

| JP | 5-197635 | 8/1993 |
| JP | 10-269144 | 10/1998 |
| JP | 10-283268 | 10/1998 |
| JP | 11-259964 | 9/1999 |

* cited by examiner

Primary Examiner—Kim Vu
Assistant Examiner—Nirav Patel
(74) Attorney, Agent, or Firm—Westerman, Hattori, Daniels & Adrian, LLP

(57) ABSTRACT

A memory card includes a user ID hold unit holding user ID data provided to identify the user of the memory card, a first protection information memory unit holding first protection information restricting access to memory card, and a second protection information memory unit holding second protection information restricting access for each content data. Memory card refers to the user ID data to identify the user of the reproduction apparatus of interest and prohibits any unauthorized user from changing first and second protection information.

18 Claims, 19 Drawing Sheets

FIG.4

| | | SYMBOL | ATTRIBUTE | CHARACTERISTICS | |
|---|---|---|---|---|---|
| KEYS FOR MANAGEMENT INTERNAL TO MEMORY CARD | | Kmc(n) | PRIVATE DECRYPTION KEY | | KEY UNIQUE TO EACH MEMORY CARD |
| | | KPmc(n) | PUBLIC ENCRYPTION KEY | | PAIRED WITH Kmc(n). DATA ENCRYPTED WITH KPmc(n) IS DECRYPTABLE WITH Kmc(n). |
| | | User-IDm | INFORMATION IDENTIFYING MEMORY CARD USER | | E.G., SETTING OF USER |
| KEY FOR MANAGEMENT EXTERNAL TO MEMORY CARD | | User-IDh | INFORMATION IDENTIFYING CELLULAR PHONE USER | | E.G., TELEPHONE NUMBER |
| DATA FOR DISTRIBUTION | | Kc(i) | SYMMETRIC KEY | LICENSE KEY | KEY UNIQUE TO EACH CONTENT DATA |
| | | License(i) | INFORMATION ON REPRODUCTION | FOR EACH CONTENT DATA | E.G., INFORMATION SPECIFYING TITLE OF MUSIC, INFORMATION RESTRICTING FREQUENCY OF REPRODUCTION |
| | | Dc(i) | CONTENT DATA | | E.G., MUSIC INFORMATION DATA |
| | | [Dc]Kc | ENCRYPTED CONTENT DATA | | CONTENT DATA ENCRYPTED WITH SYMMETRIC KEY Kc |

RECORDING DEVICE

TECHNICAL FIELD

The present invention relates to a configuration of a recording device functioning as a memory card or other similar recording media for storing information encrypted and distributed to a cellular phone or other similar terminals.

BACKGROUND ART

In recent years the Internet and other similar information communication networks have advanced and a cellular phone or the like is used for a personal terminal to allow the user to readily access network information.

In such information communication a digital signal is used to transmit information. As such, if a user copies music, video information or the like transmitted on such an information communication network as described above, each individual user can copy such information almost free of significant degradation in the quality of sound, image and the like.

Thus, if music information, image information or other similar works in copyright is transmitted on such an information communication network without any appropriate approach taken to protect the copyright, the copyright owner may have his/her right infringed significantly.

However, prioritizing copyright protection and preventing content data distribution on a rapidly expanding digital information communication work, is disadvantageous to copyright owners, who basically can collect a predetermined copyright fee for copying copyrighted works.

When an individual user receives music data or other similar copyrighted information distributed on such a digital information network as described above the user would record and thus hold the distributed content data in some form of recording medium.

Such a recording medium is for example a memory card or other similar, electrically data writable and erasable media.

In this case if such distributed content data as music data can be transferred from the recording medium of interest to another recording medium, as desired, without the copyright owner's permission the copyright owner's right cannot be protected.

Furthermore, if an individual other than a user having made payment in due course and thus received and stored distributed content data to a recording medium, can reproduce music data or the like from the recording medium or transfer and erase content data, as desired, the user's right would also not be protected.

DISCLOSURE OF THE INVENTION the present invention contemplates a recording device functioning as a medium recording data having a function to prevent individuals other than the user of interest from for example reproducing, transferring and erasing without permission the content data held in a recording medium having music data or other similar data of copyrighted works stored therein.

To achieve the above object the present invention provides a recording device detachably attachable to a reproduction apparatus reproducing and outputting encrypted content data, for receiving and recording the encrypted content data therein, including: a data input/output unit allowing external data communication; a first storage unit receiving the encrypted content data from the data input/output unit for storage; a user information hold unit holding first user data provided to identify a user of the recording device; a protection information memory unit holding protection information updatable in response to a result of comparing externally provided user information with the first user data, as externally instructed; and a control unit controlling an operation of the recording device, the control unit referring to the protection information to restrict external access to the encrypted content data held in the first storage unit.

Preferably the control unit allows the user data to be changed when externally provided user information and the first user data match.

In a distribution system of the present invention, content data received by an authorized user and stored to a memory by the user can be reproduced, erased and transferred only by the user to prevent the user from being exploited by unauthorized, undue acts.

BRIEF DESCRIPTION OF THE DRAWINGS

In the drawings:

FIG. 4 lists characteristics of key data and the like for communication used in the FIG. 3 information distribution system;

BEST MODES FOR CARRYING OUT THE INVENTION

Hereinafter the embodiments of the present invention will be described with reference to the drawings.

First Embodiment

Configuration of Terminal (Cellular Phone) Receiving Distributed Data

Figure 1:
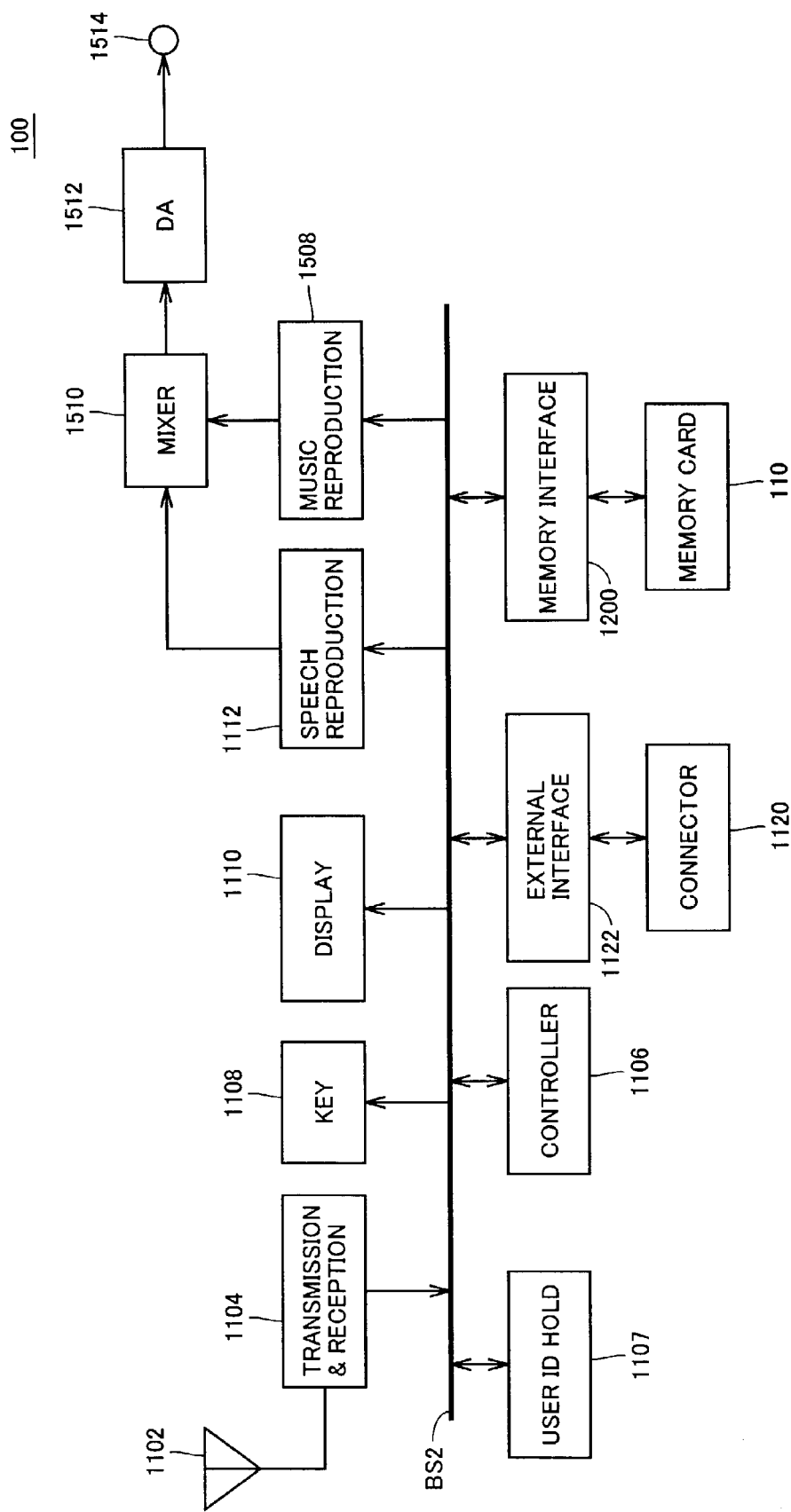
FIG. 1 is a schematic block diagram for illustrating a configuration of a cellular phone 100 serving as a terminal receiving information distributed.

FIG. 1 is a block diagram for illustrating a configuration of a cellular phone 100 serving as a terminal receiving distributed data in an information distribution system employing a recording medium of the present invention.

As shown in FIG. 1, cellular phone 100 includes an antenna 1102 receiving a signal transmitted on a cellular phone network by wireless, a transmission and reception unit 1104 receiving a signal from antenna 1102 and converting the signal to a baseband signal or modulating data of cellular phone 100 and transmitting the modulated data to antenna 1102, a data bus BS2 allowing data communication between various components of cellular phone 100, a controller 1106 controlling an operation of cellular phone 100 via data bus BS2, a user ID hold unit 1107 holding user ID data User-IDh provided to identify the owner of cellular phone 100, a key pad 1108 used to enter external instructions to cellular phone 100, a display 1110 visually presenting to the user the information output from controller 1006, an audio reproduction unit 1112 operating in a normal, conversation mode of operation to reproduce speech based on data received through data bus BS2, a connector 1120 allowing external data communication, and an external interface unit 1122 receiving data through connector 1120 and converting the data to a signal applicable to data bus BS2 or receiving data through data bus BS2 and converting the data to a signal applicable to connector 1120.

Herein, the user ID data for example includes the telephone number of the cellular phone of the user or data set by the user, or data corresponding to a combination thereof.

Cellular phone 100 further includes a detachably attachable memory card 110 storing thereto encrypted content data supplied from a music server, a memory interface 1200 controlling data communication effected between memory card 110 and data bus BS2, a music reproduction unit 1508 receiving encrypted content data from memory card 110 and a content key Kc decrypting the encrypted content data to reproduce music data, a mixer unit 1510 receiving an output of music reproduction unit 1508 and an output of music reproduction unit 1112 for selective output depending on the mode of operation of interest, a digital-analog conversion unit 1512 receiving an output of mixer unit 1510 and converting the output to an analog signal for external output, and a connection terminal 1514 receiving an output of digital-analog conversion unit 1512 for connection for example to a headphone (not shown).

It should be noted that to simplify the description FIG. 1 only shows blocks related to distribution and reproduction of music data stored in the recording medium of the present invention and the figure partially omits blocks related to the conversation function inherently provided to the cellular phone.

Configuration of Memory Card

Figure 2:
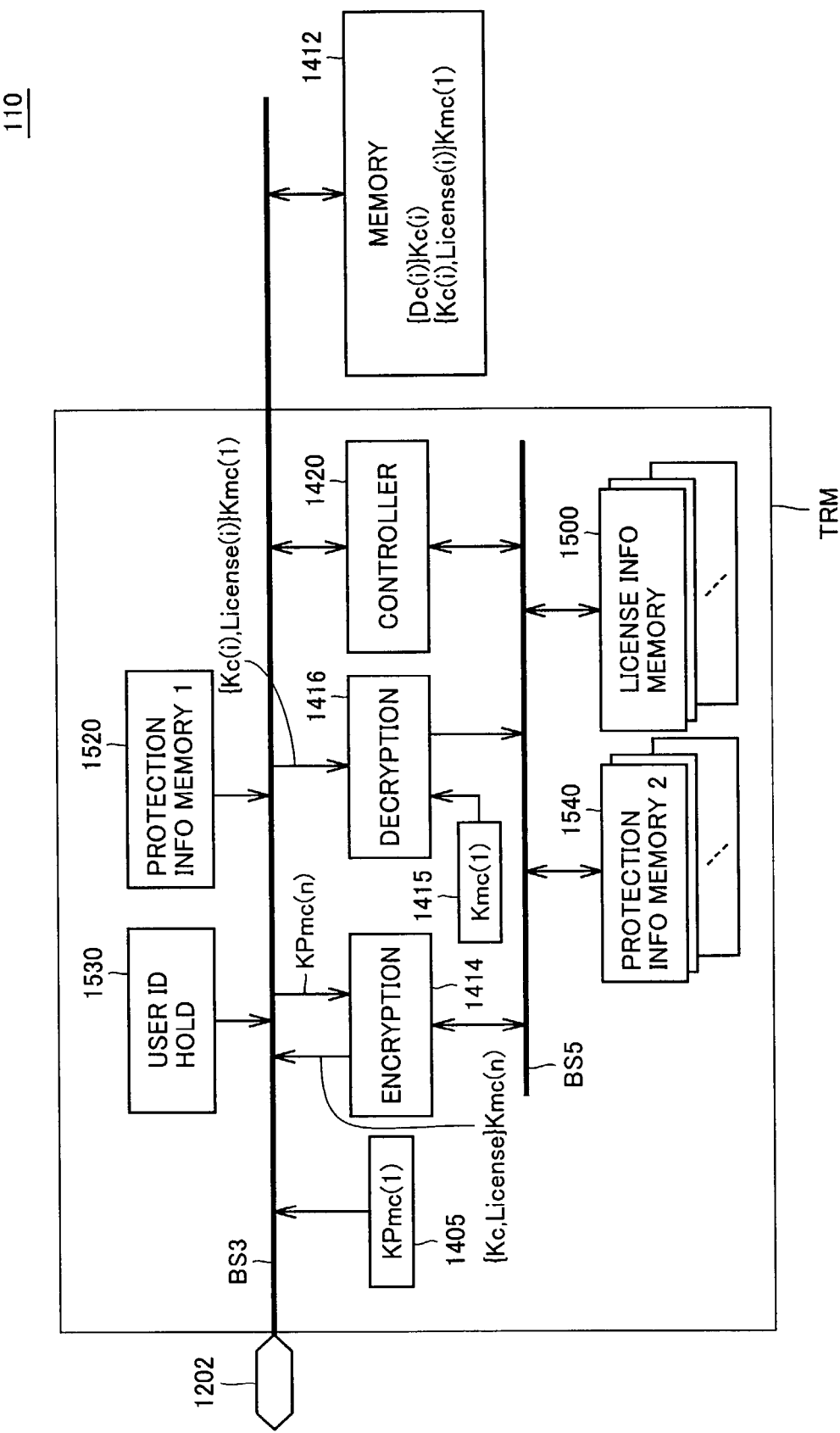
FIG. 2 is a schematic block diagram for illustrating a configuration of memory card 110 shown in FIG. 1.

FIG. 2 is a schematic block diagram for illustrating a configuration of memory card 110 shown in FIG. 1.

Hereinafter, a private decryption key unique to memory card 110 attached to cellular phone 100 is represented by a key Kmc(1) and that unique to a different memory card is represented by a key (Kmc)(n), wherein n represents a natural number. It should be noted that natural number n is provided to distinguish between memory cards. In other words, key Kmc(n) varies from memory card to memory card.

Furthermore, correspondingly, a public encryption key KPmc(1) represents a public encryption key providing encryption decryptable with private decryption key Kmc(1), and asymmetric with respect to key Kmc(1), i.e., plural in number for a single private decryption key Kmc(1), and a public encryption key KPmc(n) similarly represents a public encryption key providing encryption decryptable with private decryption key Kmc(n), and asymmetric with respect to key Kmc(n).

With reference to FIG. 2, memory card 10 includes a data bus BS3 communicating a signal with interface 1200 through a terminal 1202, a KPmc(1) hold unit 1405 holding public encryption key KPmc(1) and outputting the key to data bus BS3, an encryption unit 1414 encrypting input data with public encryption key KPmc(n) transmitted from another memory card through terminal 1202 and data bus BS3, a Kmc(1) hold unit 1415 holding private decryption key Kmc(1), a decryption unit 1416 receiving data from data bus BS3 to effect decryption depending on private decryption key Kmc(1) received from Kmc(1) hold unit 1415, a controller 1420 controlling an operation of memory card 110, and a memory 1412 receiving distributed, encrypted content data [Dc(i)]Kc(i) and encrypted content key and license information data [Kc(i), License(i)] Kmc(1) through data bus BS3 and storing and thus holding them therein. Memory 1412 is a so-called semiconductor memory and for example it can for example be a flash memory corresponding to a non-volatile memory, although it is not limited thereto.

Herein a symbol [X]Y represents data X that is encrypted through an encryption decryptable with a decryption key Y.

Memory card 110 further includes a user ID hold unit 1530 holding user ID data corresponding to information of the user of memory card 110, a first protection information memory unit 1520 holding protection information for memory card 110, a data bus BS5 transmitting for example to encryption unit 1414 and control 1420 the decrypted data output from decryption unit 1416, a license information memory unit 1500 holding license information data License (i) corresponding to content data Dc(i) and indicative of information of a reproduction right such as a limit imposed on the number of times of reproduction of the content data, the ownership of the content data and the like, and a second protection information memory unit 1540 holding content protection information set for each content data Dc(i), wherein i represents a natural number.

It should be noted that in the aforementioned configuration, the natural number i for example of content data Dc(i), content key data Kc(i) and license information data License (i) represents that the data vary for each content data.

Furthermore in FIG. 2 the region surrounded by a solid line is assumed to be incorporated in memory card 110 at a module TRM disabling reading for example of data in a circuit internal to the region for any third party for example when the memory card is externally, unduly opened as internal data is erased or internal circuitry is destroyed.

Such a module is generally referred to as a tamper resistance module.

Of course memory 1412 may also be incorporated into module TRM, although the FIG. 2 configuration, with memory 1412 holding data all encrypted, prevents a third party simply having the data in memory 1412 from reproducing music data or other similar content data. Thus it is not necessary to provide memory 1412 internal to an expensive tamper resistance module, which advantageously reduces the production cost.

Herein when in memory card 110 memory 1412 continues to hold content data and additional, different content data is additionally recorded the additional different content data is "additionally recorded", and when content data or the like in memory 1412 in memory 1412 is erased or rendered irreproducible, the data is "erased."

The Table 1 below represents a relationship between statuses of "additional recording" and "medium erasure" flags held in the first protection information memory unit 1520 of FIG. 2 for controlling the aforementioned "additional recording" and "erasure" operations, and statuses in operation of the memory card corresponding thereto.

TABLE 1

Management per medium

| protection info | value | |
| --- | --- | --- |
| | 1 | 0 |
| additionally recording flag | additionally recordable | additional recording prohibited |
| medium erasure flag | erasable | erasure prohibited |

More specifically, if the first protection information memory unit 1520 holds the additionally recording flag of "1" the flag indicates a permission to write additional, new content data in addition to content data held in memory 1412, and the additionally recording flag of "0" prohibits the additionally recording operation.

If the first protection information memory unit 1520 holds the media erasure flag of "1" then in memory card 110 data held in memory 1412 may be erased in response to an external instruction, and the media erasure flag of "0" completely prohibits the erasure operation.

Furthermore in memory card 110 the second protection information memory unit 1540 holds protection information used to control processing each content data in memory 1412 in response to an external instruction, as controlled by controller 1420.

Hereinafter, a reproduction process for each content data will be specifically referred to as "content reproduction" and an erasure operation for each content data will be specifically referred to as "content erasure."

Table 2 represents a relationship between data held in the second protection information memory unit 1540 and a status of control provided by controller 1420 of memory card 110.

TABLE 2

Management per content data

| protection info | value | |
| --- | --- | --- |
| | 1 | 0 |
| content reproduction flag | reproducible | reproduction prohibited |
| content erasure flag | erasable | erasure prohibited |

*) reproducible if user ID of cellular phone is identical

More specifically, if the second protection information memory unit 1540 holds the content reproduction flag of "1" held for each content data the corresponding content data is reproducible, and the content reproduction flag of "0" in principle prohibits reproduction of the content data of interest.

It should be noted, however, that as will be described hereinafter, if the content reproduction flag is "0" and the user ID data of cellular phone 110 and that of a memory card match, the reproduction operation is allowed for the content data of interest.

If the second protection information memory unit 1540 holds the content erasure flag of "1" held for each content data the erasure operation is allowed for the content data of interest, and the content erasure flag of "0" prohibits the erasure operation for the content data of interest.

The protection information previously set for each memory card and each content data can prevent any other individual than an authorized user from processing the content data in memory card 110, as desired, which can protect content data purchased by the user of the memory card of interest in exchange of payment corresponding thereto.

General Configuration of Distribution System

Figure 3:
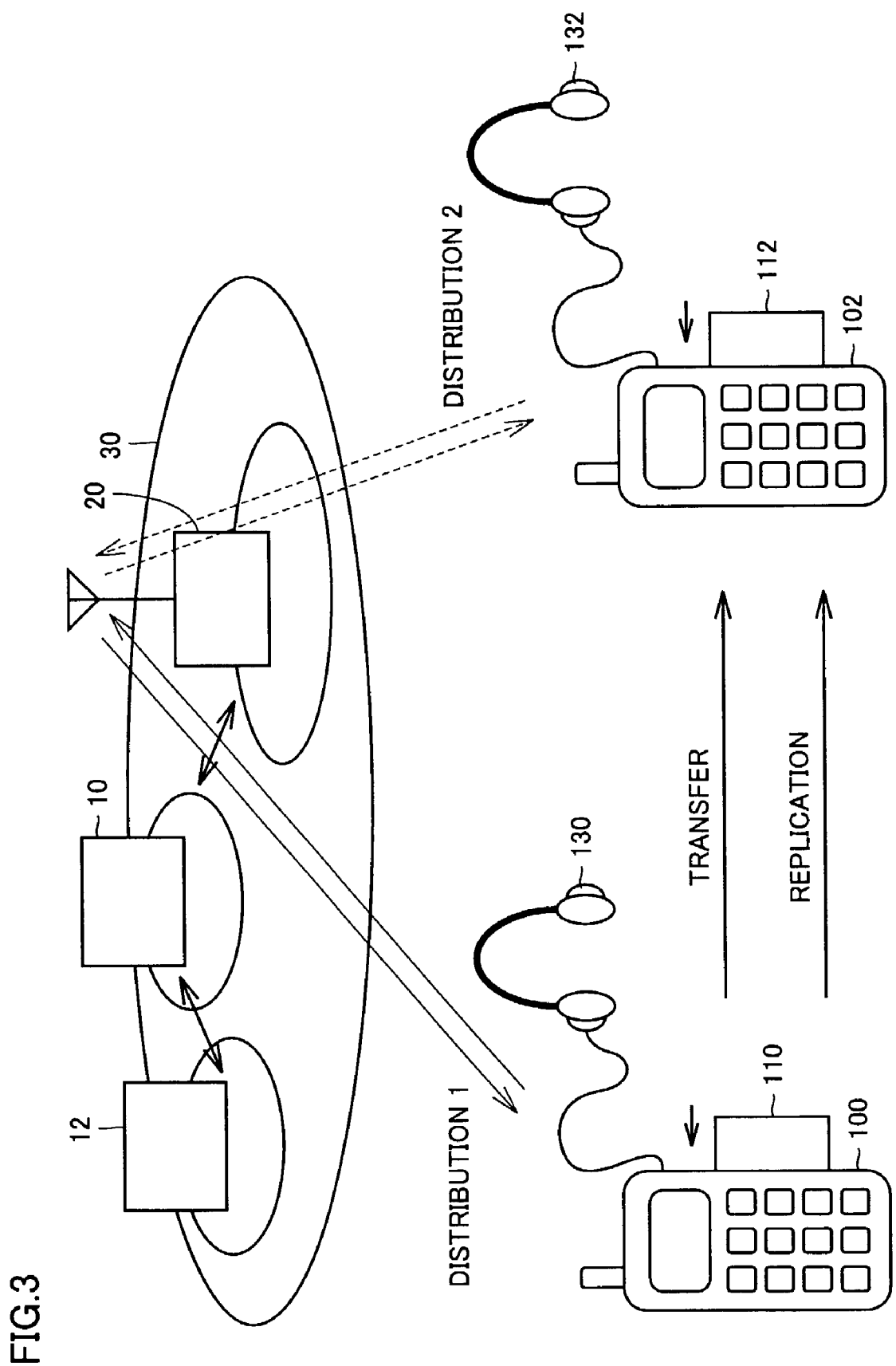
FIG. 3 shows a concept for schematically illustrating a general configuration of an information distribution system using a recording medium of the present invention.

FIG. 3 shows a concept for schematically illustrating a general configuration of an information distribution system using a recording medium of the present invention.

Note that hereinafter will be described by way of example a configuration of a data distribution system distributing digital music data to each user on a cellular phone network, although as will be apparent from the following description, the present invention is not limited thereto and it can also be used in any applications distributing data of information of other types of copyrighted work, e.g., data of copyrighted works such as image data, for example to a memory and then accessing such data.

Furthermore, data can also be distributed in manners other than cellular phone networks and for example it may be distributed on other types of information communication network or a user may purchase content data from a content data bending machine on the street through an interface of his/her cellular phone or receive directly with the memory card the data purchased from the bending machine so as to obtain the data of a copyrighted work.

Furthermore, equipment reproducing encrypted content data may be reproduced by equipment other than a cellular phone and it may be reproduced for example by a dedicated reproduction device corresponding to the memory card described above.

With reference to FIG. 3, copyrighted music information is managed by a distribution server 10, which encrypts music data, (hereinafter also referred to as content data) in a predetermined encryption system and provides such encrypted content data to a cellular phone company 20 corresponding to a distribution carrier distributing music data. An authentication server 12 effects an authentication process to determine whether a user accessing the server for distribution of music data is an authorized user.

Cellular phone company 20 relays a request for distribution from each user to distribution server 10 on its cellular phone network. When distribution server 10 receives the request it confirms via authentication server 12 whether the user is an authorized user and if so then it encrypts the requested music information and then distributes content data to the user's cellular phone on a cellular phone network of cellular phone company 20.

In FIG. 3, for example a cellular phone user 1 has cellular phone 100 having memory card 110, as has been described with reference to FIG. 2, detachably attached thereto to receive encrypted music data received by cellular phone 100 and encrypt encryption effected for the aforementioned transmission and then provide the decrypted data to a music reproduction unit (not shown) internal to cellular phone 100.

Furthermore, for example user 1 can listen to such reproduced music data for example through a headphone 120 connected to cellular phone 100.

Hereinafter, such distribution server 10, authentication server 12 and distribution carrier (cellular phone company) 20 will generally be referred to as a music server 30.

Furthermore, when music server 30 transmits music information for example to each cellular phone terminal the server "distributes" the information.

Thus, if a user is not an authorized user having purchased memory card 110 the user can hardly receive and reproduce data distributed from music server 30.

Furthermore, if whenever distribution carrier 20 for example distributes one piece of music data it increments the frequency in distribution of the piece and the copyright loyalty incurred whenever a user receives data of a copyright work is charged by distribution carrier 20 in the form of a telephone bill for the cellular phone of interest and thus corrected, the copyright owner can readily collect the loyalty.

Furthermore, data of a copyrighted work can be distributed in a closed system in the form of a cellular phone network and its copyright can be protected more readily than in an open system such as the Internet.

In this scenario, for example, it is possible for a user 2 having a memory card 112 to use his/her cellular phone 102 to directly receive music data distributed from music server 30. However, if user 2 receives from music server 30 music data or the like having a relatively large amount of information, the reception may require a relatively long period of time. It would be more convenient for users if music information can be copied from user 1 having received the music data of interest distributed from the server.

In the FIG. 3 example, music data received by user 1 is "transferred" when the music data is copied for user 2 together with the exact digital music data and information required to allow the music data of interest to be reproducible. Since user 1 allows user 2 to copy the music data together with information required for reproduction, or reproduction information, once the information has been transferred user 1 must be disallowed to reproduce the music data. Herein, the "reproduction information," as will be described hereinafter, refers to a content key capable of decrypting content data encrypted in the aforementioned, predetermined encryption system, and license information such as license ID data and user ID data serving as information related to copyright protection.

In contrast, when music data (content data) alone that is encrypted is copied for user 2, the music data is "replicated."

In this case, the user 2 terminal does not receive copied reproduction information required for reproducing content data, and user 2 simply having content data cannot reproduce music information. As such, if user 2 desires to reproduce music information, the user needs to furthermore receive from music server 30 the reproduction information allowing content data to be reproducible. In this case, however, the user only requires receiving the information allowing the data to be reproducible and user 2 can reproduce music with much shorter a temporal period of call than when the user directly receives all information from music server 30.

For example if cellular phones 100 and 102 are personal handy phones (PHSs) they allow a phone call in a so-called transceiver mode and such a function can be used to collectively shift (move) information from user 1 to user 2 or transfer (replicate) only content data.

Configuration of Encryption/Decryption Key

FIG. 4 lists characteristics of key data and the like for communication used in the FIG. 3 information distribution system.

Initially in the FIG. 3 configuration memory card 110 internally process data, as managed with a public encryption key KPmc(n) varying for each memory card and a private decryption key Kmc(n) used to decrypt data encrypted with public encryption key KPmc(n).

Note that the natural number n as represented in keys Kmc(n) and KPmc(n) represents a number employed to distinguish each memory card.

Thus when a memory card communicates distributed data the two encryption keys Kmc(n), KPmc(n) are used, as will be described hereinafter.

Furthermore a memory card holds user ID data User-IDm used to identify the user of the memory card, and a cellular phone holds user ID data User-IDh used to identify the user of the cellular phone.

Furthermore, for data to be distributed, initially there exist a symmetric key Kc (hereinafter referred to as a license key) used to encrypt music data (content data) itself, and symmetric key Kc is used to decrypt encrypted content data. Furthermore, the aforementioned license information includes a management code capable of determining the content data of interest, license information data License(i) including information for example of a limit imposed on frequency of reproduction, and the like.

Thus, license ID data can include information that can be used to exert control for protecting a copyright of a copyright owner and user ID data can be used to exert control for protecting a user having received distributed content data with authorization, e.g., preventing distributed content data from being erased without the user's permission.

In distributed data, content data Dc for example is music information data, as has been described above, and content data decryptable with license key Kc will be referred to as encrypted content data [Dc]Kc.

Configuration of Distribution Server 10

Figure 5:
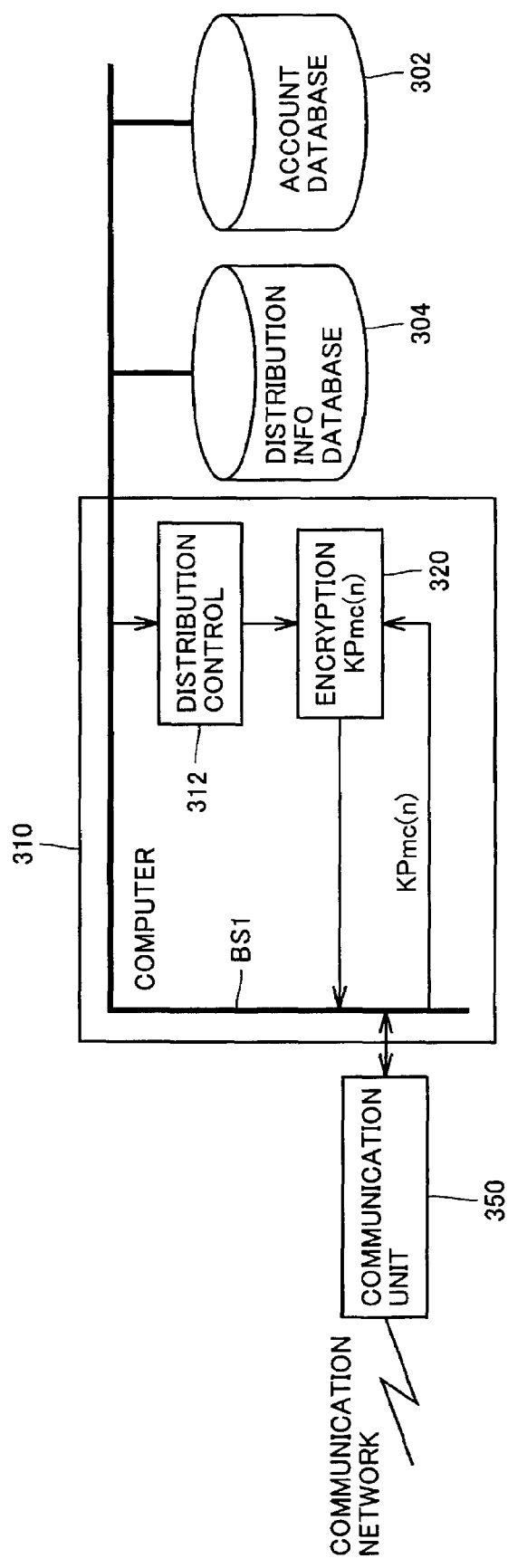
FIG. 5 is a schematic block diagram showing a configuration of the FIG. 3 music server 10.

FIG. 5 is a schematic block diagram showing a configuration of the FIG. 3 distribution server 10.

Distribution server 10 includes a distribution information database 304 holding music data (content data) encrypted in a predetermined system, license ID data and other similar distribution information, an account database 302 holding account information for each user in accordance with the user's frequency of accessing music information, a data processing unit 310 receiving data from distribution information database 304 and account database 302 through data bus BS1 for a predetermined encryption, and a communication unit 350 allowing data communication between distribution carrier 20 and data processing unit 310 on a communication work.

Data processing unit 310 includes a distribution control unit 312 operative in response to data on data bus BS1 to control an operation of data processing unit 310, and an encryption unit 320 receiving a public encryption key KPmc(n) transmitted from a memory card n on a cellular phone network and received by communication unit 350, and receiving encrypted content data from distribution control unit 312 and encrypting the data with public encryption key KPmc(n) and outputting the data to data bus BS1.

Communication unit 350 thus transmits content data encrypted by encryption unit 320, for example to cellular phone network 100 via a communication network, distribution carrier 20 and a cellular phone network, as will be described hereinafter.

Distribution Process in the First Embodiment (Without Protection Information)

Figure 6:
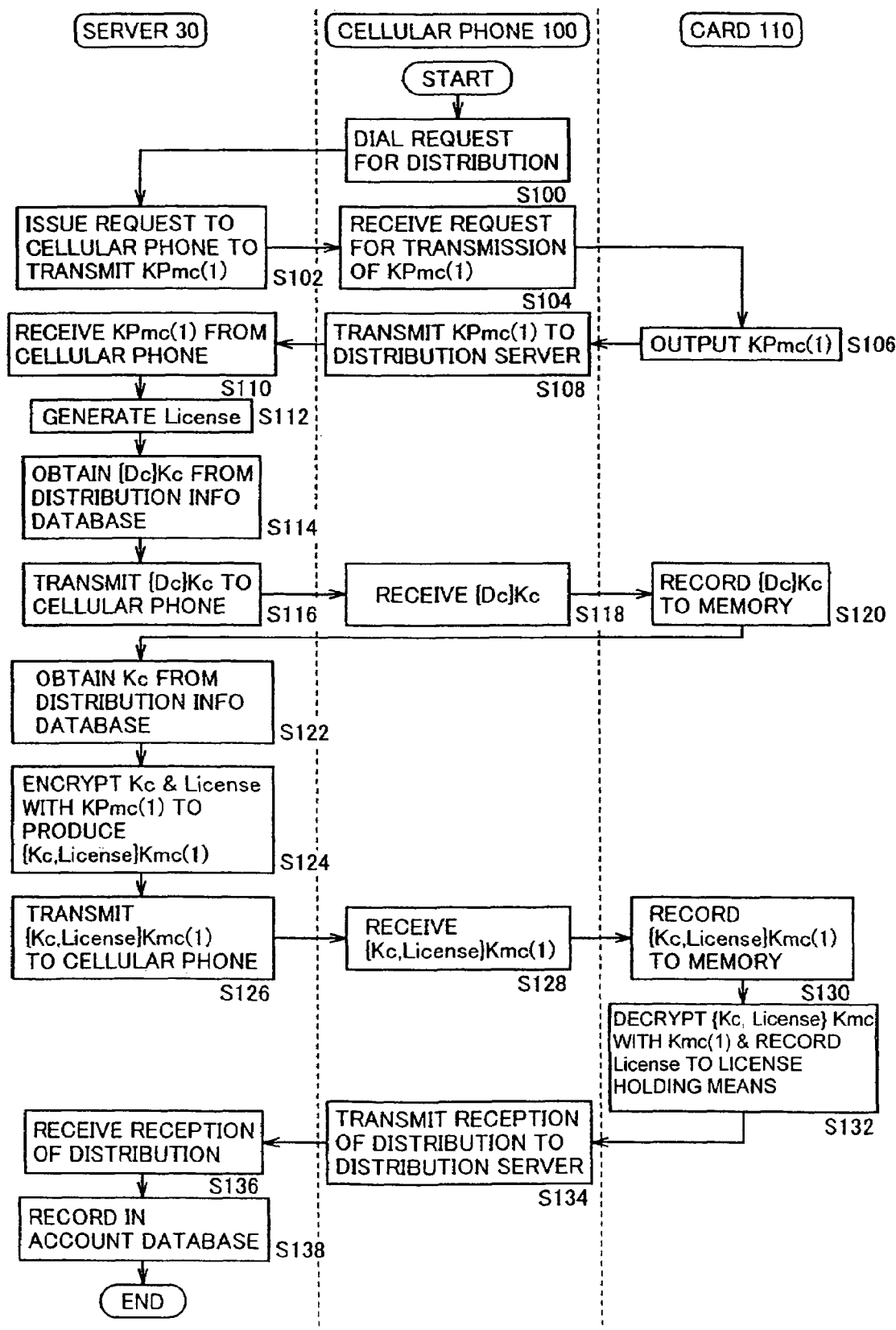
FIG. 6 is a flow chart for illustrating an operation distributing content data in the information distribution system of a first embodiment.

FIG. 6 is a flow chart for illustrating an operation distributing content data in the information distribution system described with reference to FIGS. 1, 2, 3 and 5.

FIG. 6 illustrates an operation effected when user 1 using memory card 110 receives music data distributed from music server 30.

Initially when the distribution operation starts, user 1 of cellular phone 100 for example operates a key on a keyboard 1108 to issue a request for distribution (step S100).

When distribution server 30 receives the request from cellular phone 100, distribution server 30 requests cellular phone 100 to transmit public encryption key KPmc(1) (step S102).

When cellular phone 100 receives from distribution server 30 the request to transmit public encryption key KPmc(1) (step S104), the cellular phone transfers the request to card 100, which responsively outputs public encryption key KPmc(1) to cellular phone 100 (step S106).

When cellular phone 100 receives key data KPmc(1) from memory card 110, the cellular phone transmits the data to server 30 (step S108).

When distribution server 10 receives key KPmc(1) from cellular phone 100 (step S110), distribution server 10 produces license information data License based on information received from distribution information database 304 (step S112).

Subsequently, distribution server 30 obtains content data encrypted by content key Kc, or encrypted content data [Dc]Kc, from distribution information database 304 (step S114).

Distribution server 30 then transmits encrypted content data [Dc]Kc to cellular phone 100 (step S116).

When cellular phone 100 receives encrypted content data [Dc]Kc (step S118), the cellular phone transfers the data to memory card 110 which in turn stores encrypted content data [Dc]Kc to memory 1412 as it is (step S120).

Meanwhile, server 30 obtains content key Kc from the distribution information database (step S122) and uses public encryption key KPmc(1) transmitted from memory card 110 to encrypt content key Kc and license information data License to produce data [Kc, License]Kmc(1) (step S124).

From distribution server 10 to cellular phone 100 data [Kc, License]Kmc(1) is transmitted (step S126) and when the data is received by cellular phone 100 (step S128) memory card 110 receives data [Kc, License]Kmc(1) from cellular phone 100 and stores the data to memory 1412 (step S130).

Then memory card 110 uses private decryption key Kmc(1) to decrypt data [Kc, License]Kmc(1) and stores extracted license data License to license information memory unit 1500 (step S132).

When license information data License is completely stored in license information memory unit 1500, cellular phone 100 responsively signals to distribution server 30 that the distribution of interest has been received (step S134).

When server 30 is signaled to that the distribution has been received (step S136), server 30 records distribution information in the account database (step S138).

Thus, server 30 distributes content data, license information data License and content key Kc to memory card 110.

Reproduction Process in the First Embodiment (Without Protection by Protection Information)

Figure 7:
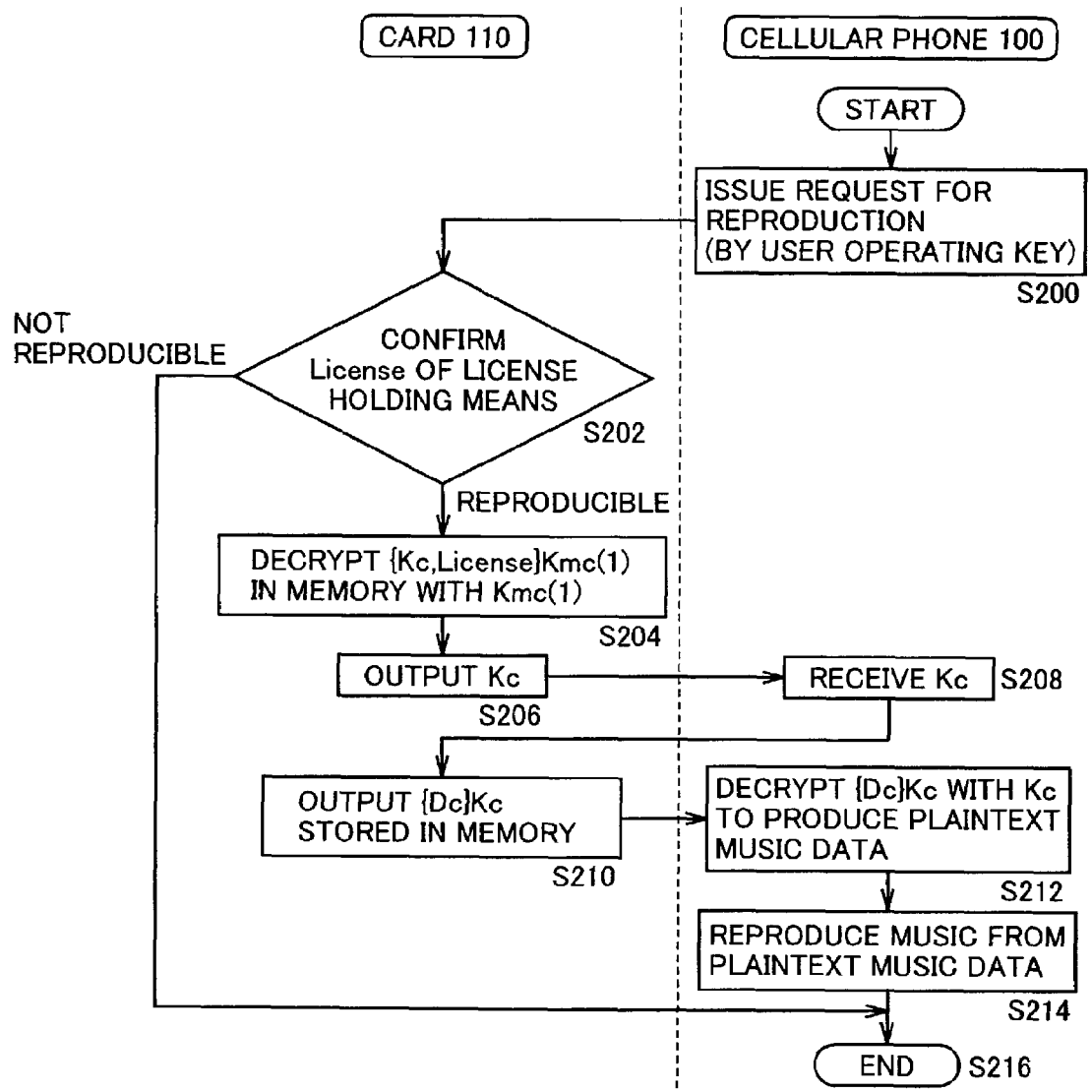
FIG. 7 is a flow chart for illustrating a process reproducing music information from encrypted content data held in memory card 110.

FIG. 7 is a flow chart for illustrating a reproduction process in cellular phone 100 for decrypting music data from encrypted content data held in memory card 100, and externally outputting the data as music. In the following will initially be described a flow of a process without such production information as described above protecting the reproduction process.

Note that hereinafter, decryption of encrypted data, i.e., data having recovered to have its original form will be referred to as "plaintext data."

With reference to FIG. 7, when the reproduction process starts, user 1 of cellular phone 100 initially enters an instruction for example via keyboard 108 to output to memory card 110 a request for reproduction (step S200).

In card 110 the request is responded by controller 1420 determining from license information data held in license information memory unit 1500 whether the request is issued for decryptable data (step S200) and if controller 1420 determines that data is reproducible then license information data [Kc, License]Kmc (1) in memory 1412 is decrypted with private decryption key Kmc(1) (step S204).

If controller 1420 determines that data is not reproducible then the process ends (step S216).

When data is determined to be reproducible and in card 110 data [Kc, License] Kmc(1) in memory 1412 is decrypted and content key Kc is thus extracted (step S204), card 110 outputs content key Kc to cellular phone 100 (step S206).

When cellular phone 100 receives content key Kc (step S208), memory card 110 subsequently outputs to cellular phone 100 encrypted content data [Dc]Kc stored in memory 1412 (step S210).

In cellular phone 100 music reproduction unit 1508 uses content key Kc received from memory card 100 to decrypt encrypted content data [Dc]Kc to generate plaintext music data (step S212).

Music reproduction unit 1508 provides an output which is in turn transmitted via mixer unit 1510 to digital-analog conversion unit 1512 which reproduces plaintext music data in the form of an analog music signal and outputs it (step S214) and the reproduction process thus ends (step S216).

Thus, there is provided music reproduction process using an encryption content key distributed from distribution server 10 to memory card 110.

Transfer Process in the First Embodiment (Without Protection by Protection Information)

Figure 8:
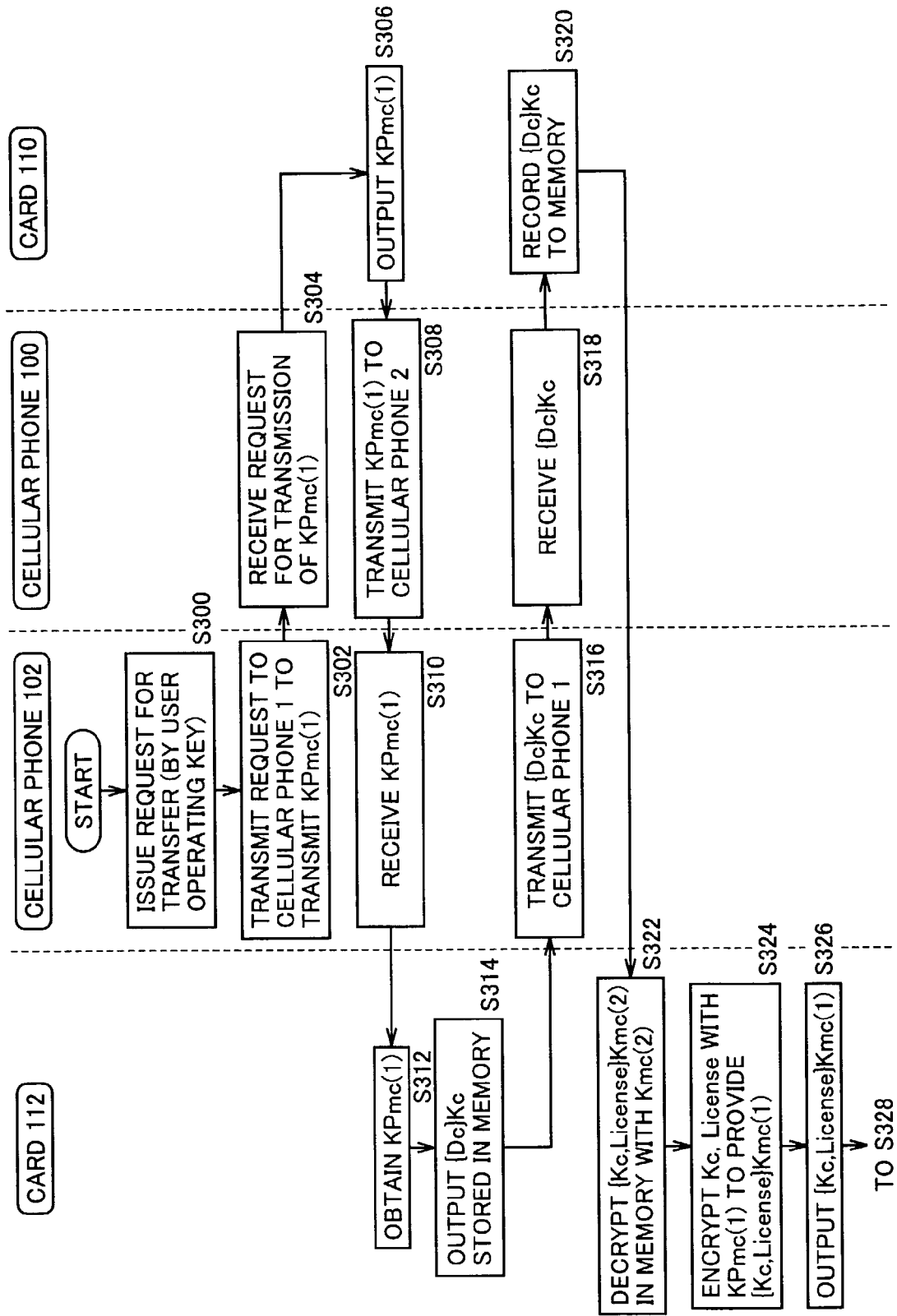
FIGS. 8 and 9 are first and second flowcharts, respectively, for illustrating a process provided to transfer content data and key data between two memory cards.
Figure 9:
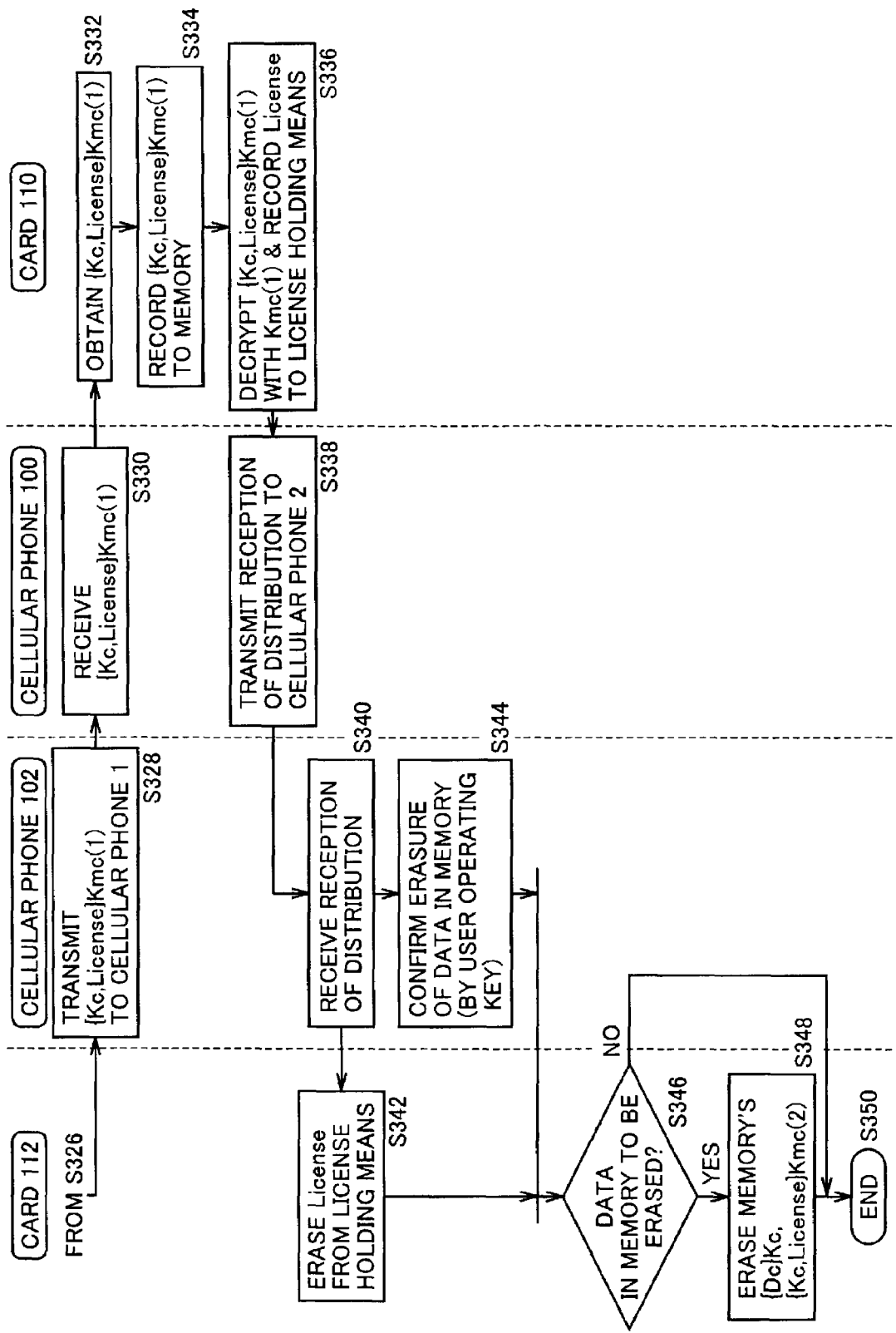

FIGS. 8 and 9 are a flow chart for illustrating a process transferring content data and key data between two memory cards.

FIGS. 8 and 9 will also be initially referenced to describe the process without protection provided by protection information.

Initially, a cellular phone 102 is a transmitting side and cellular phone 100 is a recipient side for the sake of illustration. Furthermore, cellular phone 102 also has attached thereto a memory card 112 similar in configuration to memory card 110 for the sake of illustration.

When the transfer operation starts, a user 2 of cellular phone 102 for example operates key pad 1108 to issue a request to transfer data (step S300) and from cellular phone 102 to cellular phone 100 a request to transmit public encryption key KPmc(1) is transmitted (step S302).

When cellular phone 100 receives the request to transmit public encryption key KPmc(1) (step S304), memory card 110 responsively outputs public encryption key KPmc(1) (step S306).

Cellular phone 100 receives public encryption key KPmc(1) from memory card 110 and outputs the key to cellular phone 102 (step S308) and when cellular phone 102 receives key KPmc(1) (step S310) cellular phone 102 transfers the key to memory card 112.

When memory card 112 receives key data KPmc(1) (step S312), memory card 112 outputs to cellular phone 102 encrypted content data [Dc]Kc stored in its memory 1412 (step S314).

Cellular phone 102 transmits encrypted content data [Dc]Kc to cellular phone 100 (step S316) and when the data is received by cellular phone 100 (S318) the transferred, encrypted content data [Dc]Kc is stored by memory card 110 to memory 1412 of memory card 110 (step S320).

Then in memory card 112 encrypted license information data [Kc, License]Kmc(2) in memory 1412 or the memory card is decrypted with private decryption key Kmc(2) (step S322).

Then memory card 112 uses the memory card 110 public encryption key KPmc(1) transmitted from memory card 110 to encrypt content data Kc and license information data License to generate data [Kc, License]Kmc(1) (step S324) and output the generated data to cellular phone 102 (step S326).

Then with reference to FIG. 9 cellular phone 102 transmits encrypted data [Kc, License]Kmc(1) to cellular phone 100 (step S328) and cellular phone 100 receives the data (step S330), and memory card 110 receives transferred data [Kc, License]Kmc(1) (step S332).

Then memory card 110 stores received data [Kc, License]Kmc(1) thereto at memory 1412 (step S334) and then uses private decryption key Kmc(1) to decrypt the data and store extracted license information data License to license information memory unit 1500 (step S336).

When in memory card 110 license information data License is completely stored to license information memory unit 1500, cellular phone 100 signals to cellular phone 102 that the distribution of interest has been received (step S338) and when cellular phone 102 is signaled to accordingly (step S340), in memory card 112 at license information memory unit 1500 license information data License is erased (step S342).

When in memory card 112 license information data License has been completely erased (step S342) and user 2 also confirms via cellular phone 102 on key pad 1108 whether to erase data stored in memory card 112 at memory 1412 (step S344), subsequently in memory card 112 controller 1420 determines whether to erase the data in the memory (step S346) and if in step S344 erasure of data in memory 1412 has been confirmed then in memory card 112 at memory 1412 data [Dc]Kc and [Kc, License]Kmc(2) are erased (step S348) and the process thus ends (step S350).

If data erasure from memory is not permitted (step S346), the process ends as it is (step S50).

If data erasure in memory is not permitted, with memory card 112 including license information memory unit 1500 having license information data License erased therefrom, memory card 112 could not reproduce encrypted content data [Dc]Kc without receiving new content key data Kc and license information data License from server 30 and holding license information in license information memory unit 1500.

Process Changing User ID, Protection Information

Figure 10:
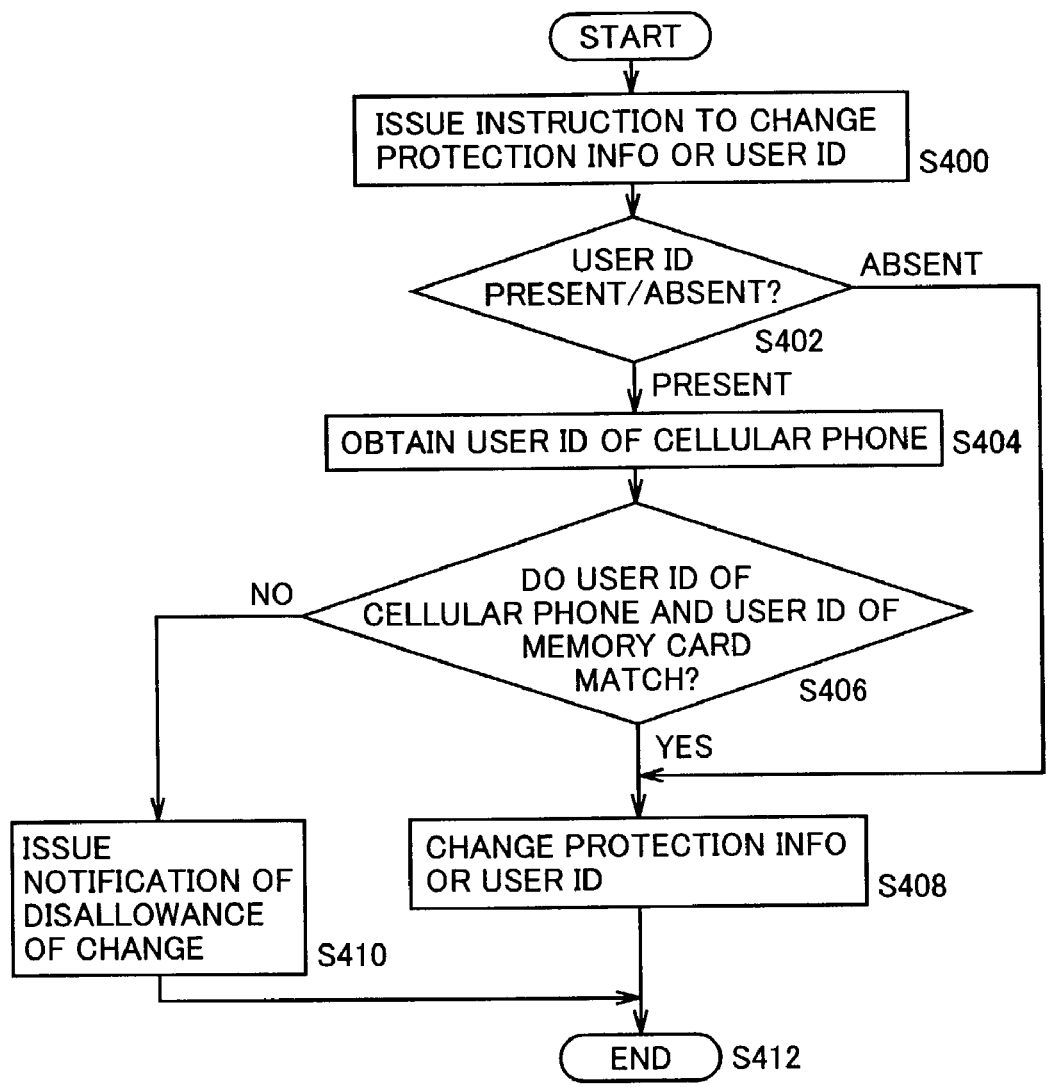
FIG. 10 is a flow chart for illustrating a process instructing to change the memory card 110 protection information or user ID data User-IDm.

FIG. 10 is a flow chart for illustrating a process for an instruction to change protection information of memory card 110 of the present invention (a medium erasure flag, an additionally recording flag, a content reproduction flag and a content erasure flag) or user ID data User-IDm.

Initially when the process starts, the user of cellular phone 100 for example operates key pad 1108 to enter an instruction to change protection information or user ID data (step S400).

Then the control determines whether a memory card has user ID data registered therein (step S402) and if so then in memory card 110 controller 1420 obtains from user ID hold unit 1107 of cellular phone 100 user ID data User-IDh registered in cellular phone 100 (step S404).

Then controller 1420 compares the value of user ID data User-IDh registered in cellular phone 100 and user ID data User-IDm registered in the memory card at user ID hold unit 1520 (step S406) and if they match then protection information or a user ID is changed (step 408) and the process thus ends (step S412). Herein, changing user ID data may be rewriting registered user ID data from a value to a different value or it may be erasing the value of registered user ID data. Furthermore, if more than one user ID can be registered, further user ID data may be added.

Furthermore, in this case, changing protection information may be changing management data per medium in the first protection information memory unit 1520 or it may be changing each management unit per content data in the second protection information memory unit 1540.

If in step S402 the memory card does not have a user ID registered therein then without comparing with user ID information registered in the cellular phone, controller 1420 changes protection information or user ID data (step S408) and the process thus ends (step S412).

If in the memory card a user ID is registered and at step S406 the cellular phone's user ID and the memory card's user ID do not match then controller 1420 notifies cellular phone 100 that changing protection information or user ID data is disallowed (step S410) and the process thus ends (step S412).

Cellular phone 100 accordingly notified notifies the user accordingly for example on display 1110.

Reproduction Process (with Protection Information Considered)

Figure 11:
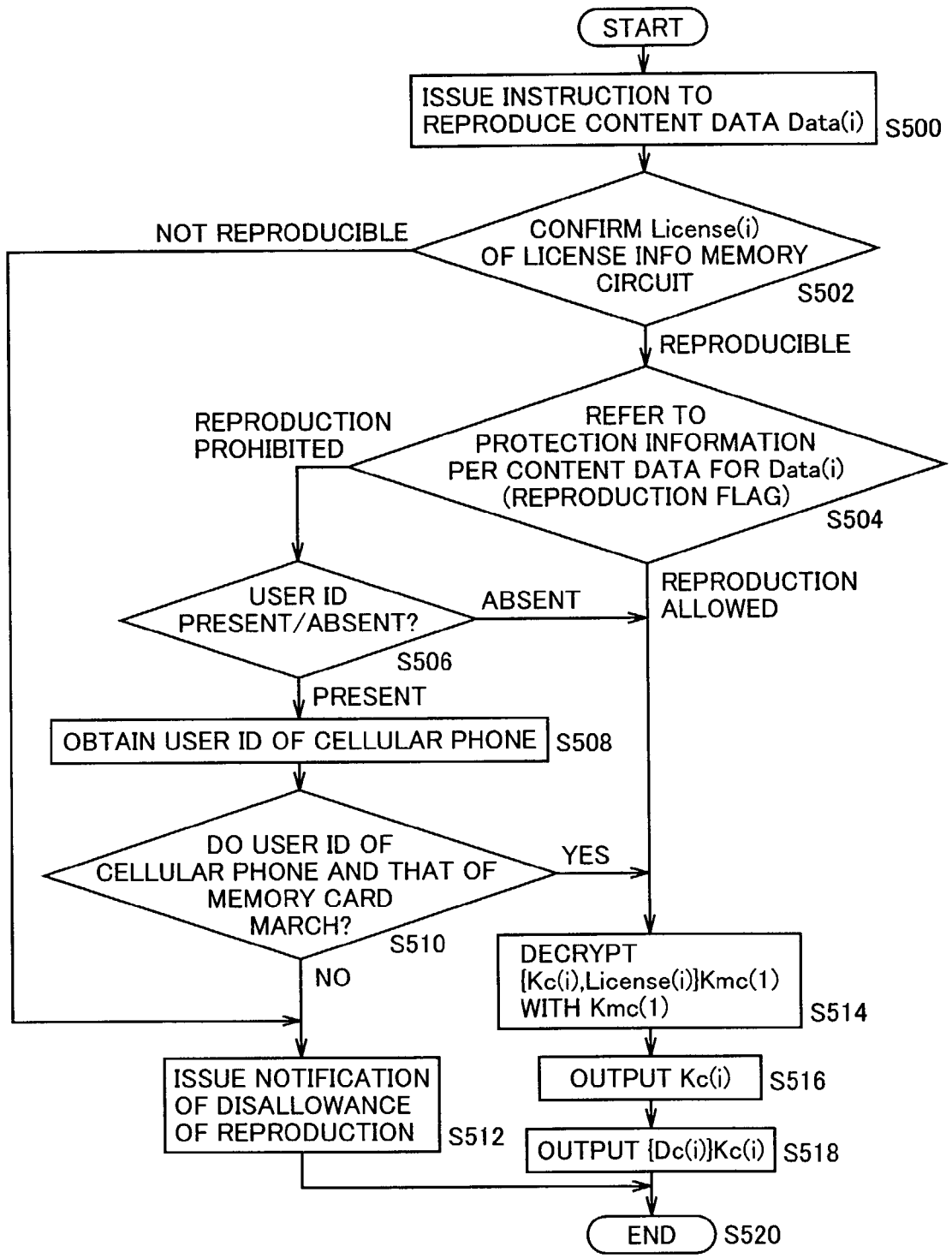
FIG. 11 is a flow chart for illustrating an operation reproducing content data Dc(i) of memory card 110 with protection information considered.

FIG. 11 is a flow chart for illustrating an operation of memory card 110 with protection information taken into consideration when an instruction is issued to reproduce content data Dc(i) of the memory card of the present invention, as compared with FIG. 7 showing the operation of the memory card without protection information considered.

When the process starts, the user of cellular phone 100 for example operates a key on key pad 1108 to enter an instruction to reproduce content data Dc(i) of a plurality of content data (step S500).

Natural number i distinguishes between a plurality of music data recorded in a memory card.

In memory card 110 controller 1420 in response to the instruction confirms content of license information data License(i) corresponding to content data Dc(i) held in license information memory unit 1500 (step S502). For example if license information data License(i) has a value applied to limit frequency of reproduction and a value falls within the limited range then a determination is made that data is reproducible and the control moves onto a subsequent process step.

If license information data License(i) designates disallowance of reproduction then controller 1420 notifies cellular phone 100 accordingly (step S512) and the process thus ends (step S520).

If data is determined to be reproducible then controller 1420 inquires the second protection information memory unit 1540 about protection information per content data for content data Dc(i) to confirm a value of a content reproduction flag (step S504). If the content reproduction flag is set in a status allowing content data Dc(i) to be reproduced then controlled by controller 1420 decryption unit 1416 decrypts encrypted data [Kc(i), License(i)]Kmc(1) in memory 1412 with private decryption key Kmc(i) (step S514).

Thus content key Kc(i) is decrypted and extracted and output to cellular phone 100 and thus received by music reproduction unit 1508 (step S516).

Furthermore from memory 1412 encrypted content data [Dc(i)]Kc(i) is output to cellular phone 100 and thus received by music reproduction unit 1508 (step S1518) and the process thus ends (step S520).

If at step S504 the content reproduction flag has a level indicating that reproduction is prohibited then a determination is made whether in user ID hold unit 1520 a user ID is registered (step S506) and if not then the control moves onto step S514 and content key data Kc(i) is decrypted and extracted and encrypted content data [Dc(i)]Kc(i) is output.

By contrast, if in user ID hold unit 1520 a user ID is registered then controller 1420 obtains user ID data of cellular phone 100 from user ID hold unit 1107 of cellular phone 100 (step S508) and determines whether user ID data User-IDh registered in cellular phone 100 and user ID data User-IDm registered in the memory card match in value (step S510).

If the user ID of cellular phone 100 and that of memory card 100 match then the control moves onto step S504 and a content key is extracted and encrypted content data is output.

If the user ID of cellular phone 100 and that of memory card 110 fail to match (step S510) then controller 1420 notifies cellular phone 100 that reproduction is disallowed (step S512) at the process thus ends (step S520).

Thus, for each content data, license information data can be used for copyright protection and user ID data and protection information can be used for user protection and in addition thereto content data (music data) can be reproduced.

Erasure Process

Figure 12:
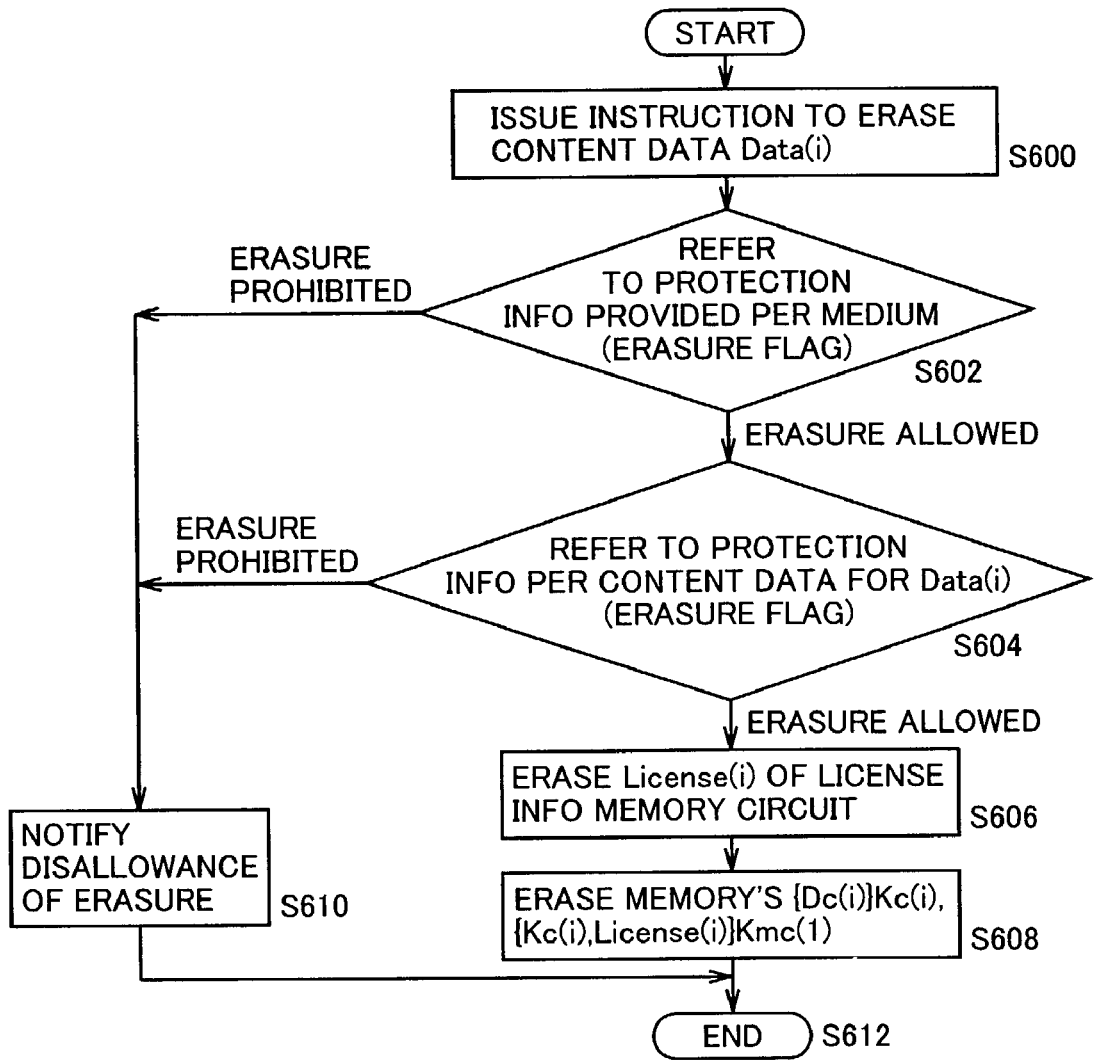
FIG. 12 is a flow chart for illustrating an operation erasing content data held in memory card 110.

FIG. 12 is a flow chart for illustrating an operation erasing content data held in memory card 110.

The process starts and the user of cellular phone 100 for example operates key pad 1108 to issue an instruction to erase content data Dc(i) (step S600). Initially in memory card 110 controller 1420 confirms a value of a medium erasure flag in the first protection information memory unit 1520 recording protection information for memory card 110 (step S602).

If the medium erasure flag indicates that erasure is allowed then the control moves onto a subsequent step and if the flag indicates that erasure is prohibited then controller 1420 notifies cellular phone 100 that erasure is disallowed (step S610) and the process thus ends (step S612).

If the medium erasure flag indicates that erasure is allowed then controller 1420 inquires of the second protection information memory unit 1540 about protection information per content data for content data Dc(i) erasure of is which instructed, and controller 1420 confirms a value of the content erasure flag (step S604).

If the content erasure flag indicates that erasure of content data Dc(i) is allowed then the control moves onto a subsequent step. If the flag indicates that erasure of the data is prohibited then controller 1420 notifies cellular phone 100 that erasure is disallowed (step S610) and the process thus ends (step S612).

If the content erasure flag indicates that erasure of content data Dc(i) is allowed then controller 1420 erases license information data License(i) corresponding to content data Dc(i) stored in license information memory unit 1500 (step S606) and erases encrypted content data [Dc(i)]Kc(i) corresponding to the content data held in memory 1412 and the corresponding encrypted content key and encrypted license information data [Kc(i), License(i)]Kmc(1) (step S608) and the process thus ends (step S612).

Thus, whether an erasure operation can be provided can be designated for each memory card and whether an erasure operation is allowed can also be designated for each content data in accordance with protection information. This can prevent content data in memory 1412 from being erased without permission of a user having received the content data distributed.

Transfer Process (on the Side Outputting Content Data with Protection Information Considered)

Figure 13:
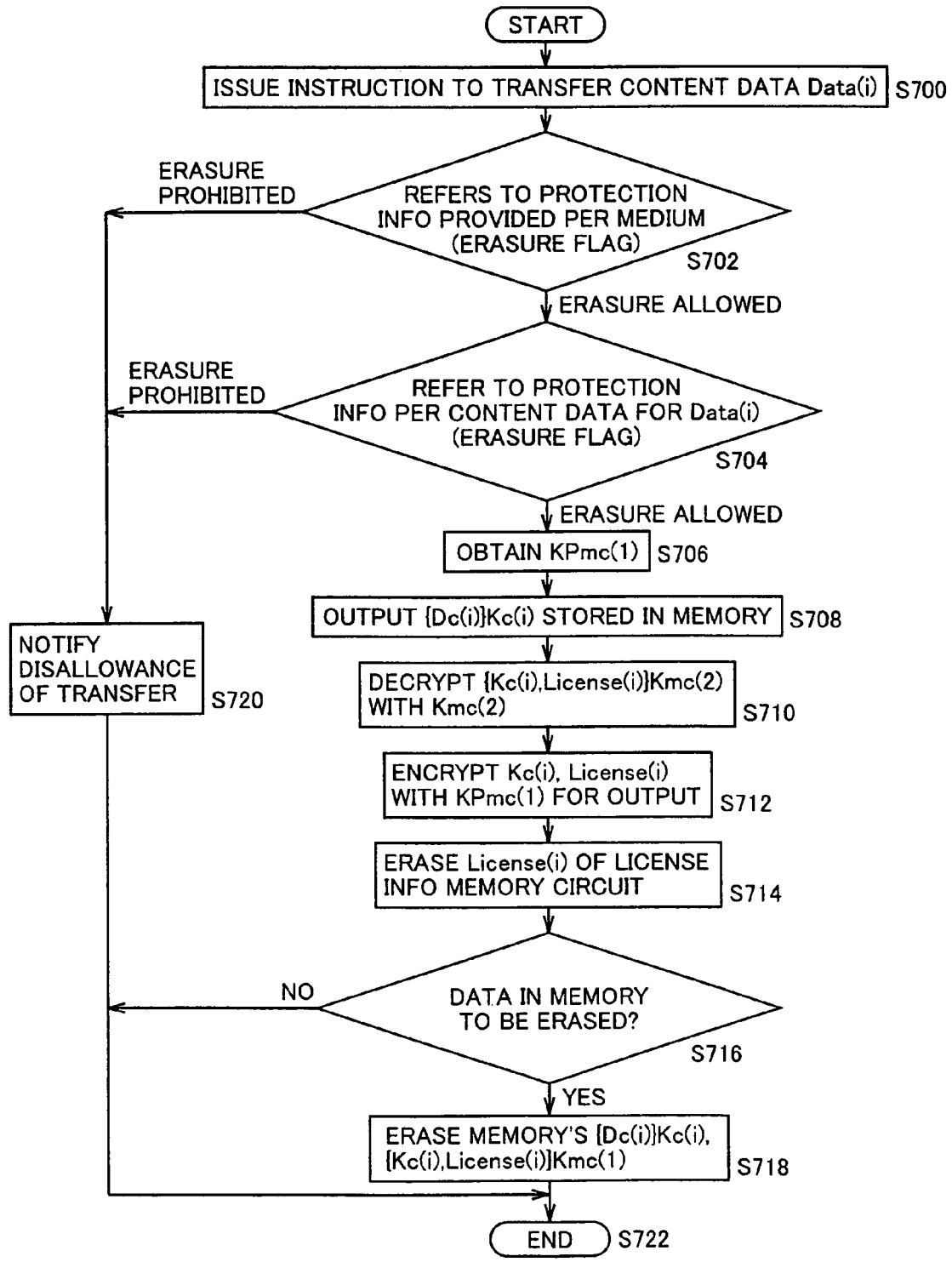
FIG. 13 is a flow chart for illustrating a flow of a process provided when a transfer process is effected with protection information considered.

FIG. 13 is a flow chart for illustrating a transfer process with protection information taken into consideration when memory card 112 is a source of content data to be transferred, as compared with the process in card 112 described with reference to FIGS. 8 and 9.

When the process starts, the user of cellular phone 102 initially for example operates key pad 1108 to enter an instruction to transfer content data Dc(i) (step S700) and subsequently in memory card 112 controller 1420 initially inquires protection information per medium registered in the first protection information memory unit 1520 and confirms a value of a medium erasure flag (step S702).

If the medium erasure flag indicates that erasure is allowed then the control moves onto a subsequent step and if the flag indicates that erasure is prohibited then in memory card 112 controller 1420 notifies cellular phone 102 that transfer is disallowed (step S720) and the process thus ends (step S722).

If the medium erasure flag indicates that erasure is allowed (step S720) then in memory card 112 controller 1420 inquires of the second protection information memory unit 1540 about protection information per content data for content data Dc(i) and confirms a level of the content erasure flag (step S704).

If the flag indicates that erasure of content data Dc(i) is prohibited then controller 1420 notifies cellular phone 102 that transfer is disallowed (step S720) and the process thus ends (step S722).

If the content erasure flag indicates that erasure is allowed then in memory card 112 controller 1420 obtains public encryption key KPmc(1) from KPmc(1) hold unit 1405 (step S706) and then outputs to a destination memory card 110 via cellular phone 100 encrypted content data [Dc(i)]Kc(i) stored in memory 1412 (step S708).

Then in memory card 112 controller 1420 controls decryption unit 1416 to decrypt data [Kc(i), License(i)]Kmc(2) in memory 1412 with its private decryption key Kmc(2) (step S710).

Furthermore in memory card 112 controller 1420 controls encryption unit 1414 to encrypt the decrypted content data and license information data with public encryption key KPmc(1) transmitted by the destination memory card 110 for the destination memory card 110 to generate data [Kc(i), License(i)]Kmc(1) and output it via cellular phone 102 to the destination memory card 110 (step S712).

Then in memory card 112 controller 1420 erases license information data License(i) corresponding to content data Dc(i) held in license information memory unit 1500 (step S714).

Subsequently in memory card 112 controller 1420 asks the user for example via the display of cellular phone 102 whether to erase data stored in memory 1412 and if the user enters an instruction for example via key pad 1108 to erase the data (step S716) then in memory 1412 (step S718) encrypted content data [Dc(i)]Kc(i) and an encrypted content key and license information data are erased and the process thus ends (step S722).

If the user does not enter an instruction to erase the data stored in memory 1412 then the process ends without erasing encrypted content data, encrypted content key data and license information data stored in memory 1412 (step S722).

As has been described for collective transfer of content data, while in memory 1412 encrypted content data is not erased, in license information memory unit 1500 the license information data corresponding to content data Dc(i) of interest has been erased and memory card 110 thus cannot reproduce the content data.

Thus, protection information can be referenced for each content data, while content data can be transferred from source memory card 112 to destination memory card 110.

Distribution and Transfer Process (on Content Data Recipient Side with Protection Information Considered)

Figure 14:
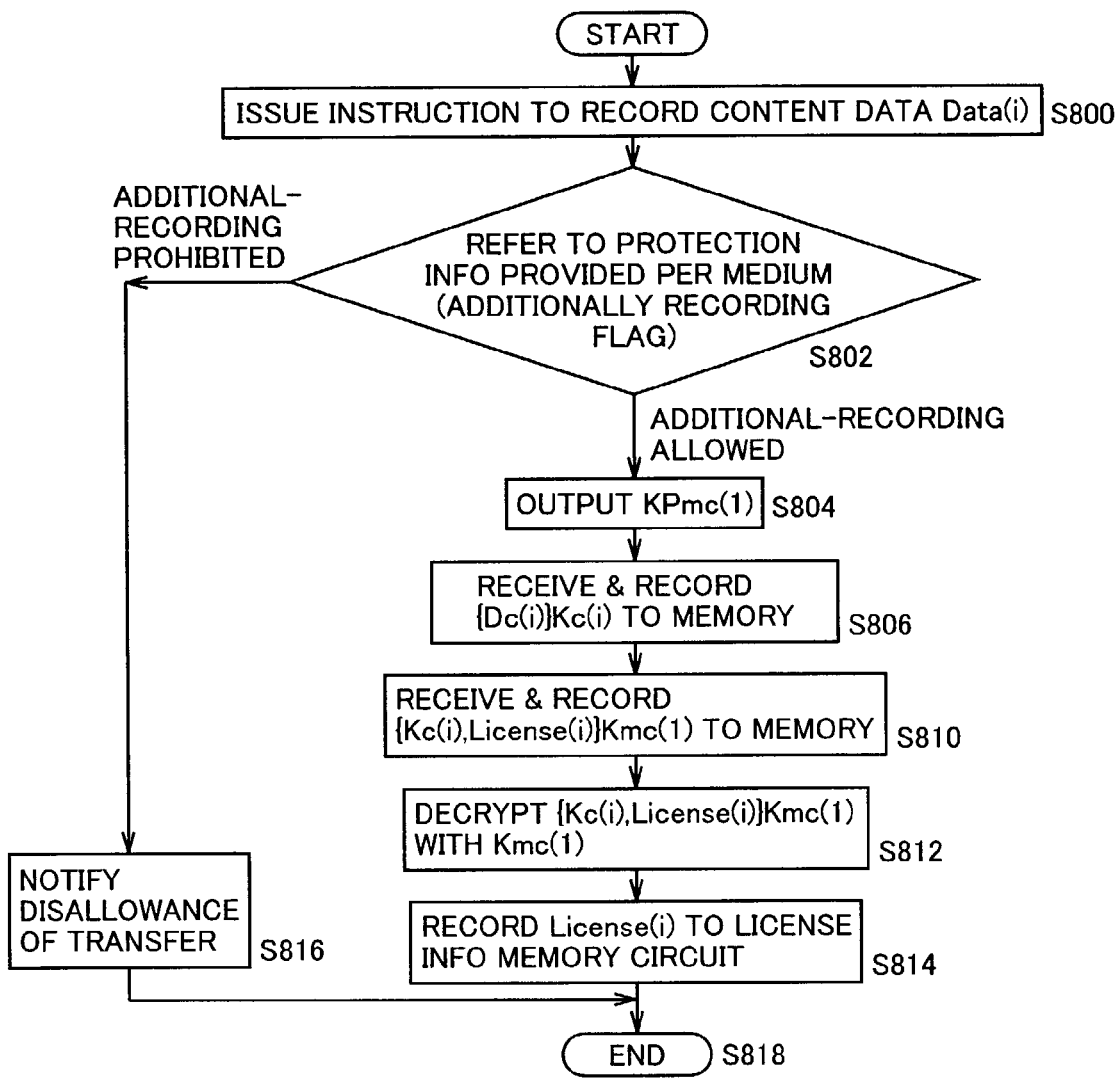
FIG. 14 is a flow chart for illustrating a process additionally writing data to a memory card acting as a receiving side in a transfer operation, with protection information considered.

FIG. 14 is a flow chart for illustrating a process additionally recording content data to memory card 110 for example acting as a recipient in a transfer operation with protection information considered, as compared with the process in card 110 as described with reference to FIGS. 8 and 9.

If content data is additionally recorded, the content data that is transferred between memory cards may be received, as has been described previously, or it may be received from distribution server 10 on a cellular phone network, or the content data may be written directly to a memory card via a content data vending machine installed on the street.

When the process starts, user 2 of cellular phone 102 for example operates key pad 1108 to issue an instruction to memory card 110 to transfer (record) content data Dc(i) (step S800).

Subsequently in memory card 110 controller 1420 refers to the first protection information memory unit 1520 for protection information per medium to confirm a level of an additionally recording flag (step S802). If additional recording is prohibited then controller 1420 notifies cellular phone 100 that transfer is disallowed (step S816) and the process thus ends (step S818). The notification that transfer is disallowed is further transmitted from cellular phone 100 to cellular phone 102.

If the additionally recording flag indicates that additional recording is allowed then memory card 110 outputs from KPmc(1) hold unit 1405 public encryption key KPmc(1) for memory card 110 to a source of data to be transferred to be additionally recorded, or memory card 112, (step S804) and receives encrypted content data [Dc(i)]Kc(i) from the source and stores the data to memory 1412 (step S806).

Subsequently memory card 110 receives from the source via cellular phone 100 content key data and license information data encrypted with public encryption key KPmc(1) for memory card 110 [Kc(i), License(i)]Kmc(1) and stores the data to memory 1412 (step S806).

Subsequently controller 1420 controls decryption unit 1416 to decrypt the content key data and license information data in memory 1412 with private decryption key Kmc(1) (step S812) and stores the decrypted license information data License(i) to license information memory unit 1500 (step S814) and the process thus ends (step S818).

Thus, content data can be additionally recorded per content data.

More specifically, first, a memory card can hold user ID data User-IDm while a cellular phone can hold user ID data User-IDh. As such, if the user of the memory card and that of the cellular phone do not match, protection information, user ID data User-IDm and the like cannot be changed and any user properly purchasing content data can thus be protected.

Second, in reproduction, transfer and erasure processes, protection information set by a user can prevent content data from being reproduced or erased or transferred to another memory card without permission of the authorized purchaser of interest.

Second Embodiment

In the first embodiment, if the user of a memory card and that of a cellular phone do not match, protection information, user ID data User-IDm and the like cannot be changed, and furthermore in reproduction, transfer and erasure processes, protection information set by a user can prevent content data from being reproduced, erased and/or transferred to another memory card without permission of the authorized purchaser of interest.

In a second embodiment, transfer or erasure of license information corresponding to content data is prohibited to limit transfer of the content data when user ID data of a memory card and that of a cellular phone having the memory card attached thereto do not match.

Initially, as has been described in the first embodiment, user ID data User-IDm is recorded in memory card 110 at user ID hold unit 1520 and also in cellular phone 100 user ID hold unit 1107 has user ID data User-IDh recorded therein for the sake of illustration.

Figure 15:
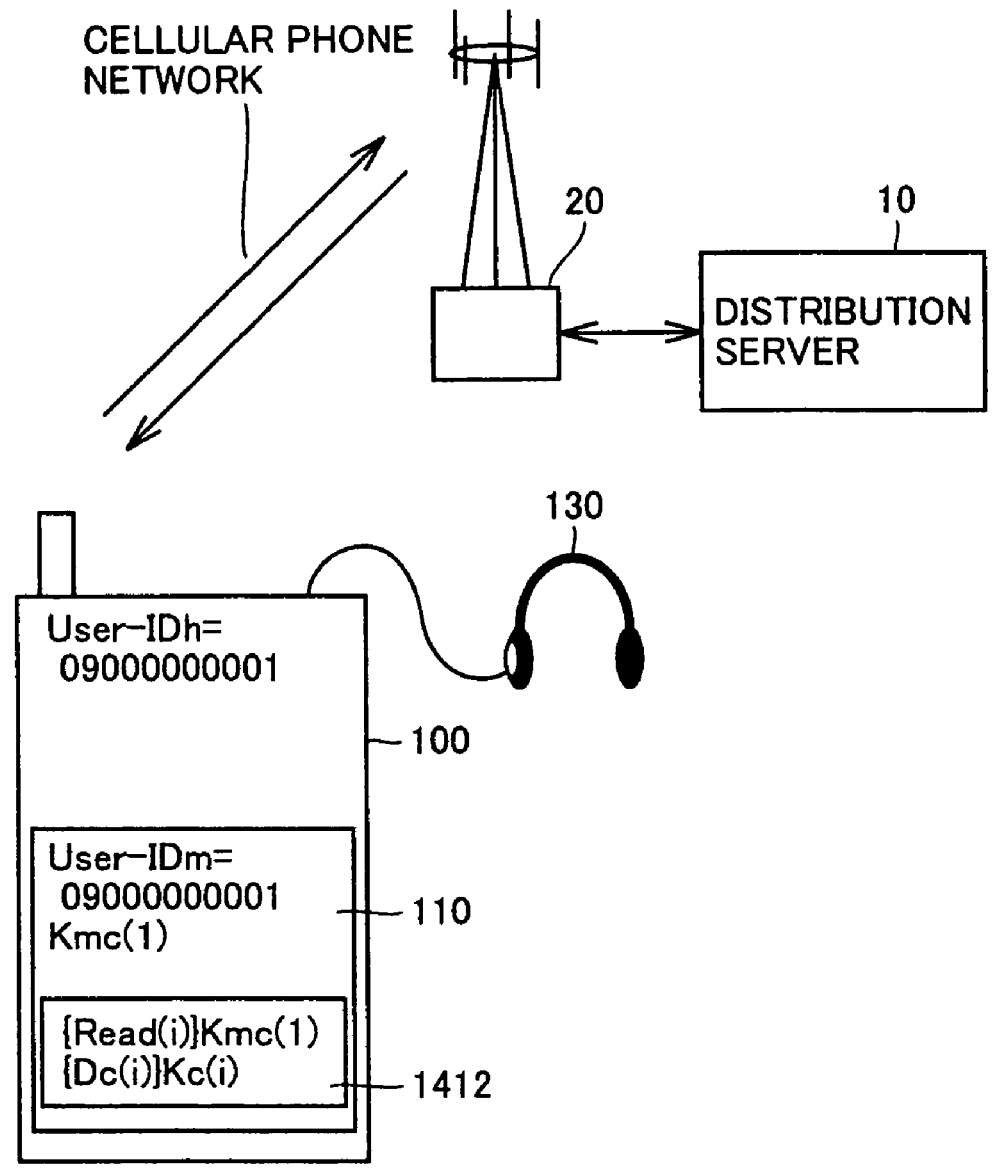
FIG. 15 shows a concept that memory card 110 receives content data distributed.

FIG. 15 shows a concept that cellular phone 100 thus configured with memory card 110 attached thereto receives content data distributed via distribution server 10 and distribution carrier (cellular phone company) 20.

In the FIG. 15 configuration, reproduction information Read(i) for ith content data Dc(i) is a combination of content decryption key Kc(i), license ID data License-ID(i) and user ID data User-ID(i) indicating a user when content data distributed is received.

Herein, user ID data User-ID(i) corresponding for each content data and included in license information has a value of ID data User-IDh transferred when the content data is distributed.

If distribution server 10 distributes encrypted content data Dc(i) on a cellular phone network, a cellular phone has user ID data User-IDh of "09000000001" recorded therein and memory card 110 also holds therein user ID data User-IDm holding a value of "09000000001" for the sake of illustration, and reproduction information Read(i) corresponding to content data Dc(i) also includes user ID data User-ID(i) of "09000000001" for the sake of illustration.

Reproduction information Read(i) is stored in memory card 110 at memory 1412 in the form of data encrypted with encryption key KPmc(1), i.e., [Read(i)]Kmc(1) for the sake of illustration.

Furthermore in memory card 110 memory 1412 holds encrypted content data [Dc(i)]Kc(i).

Figure 16:
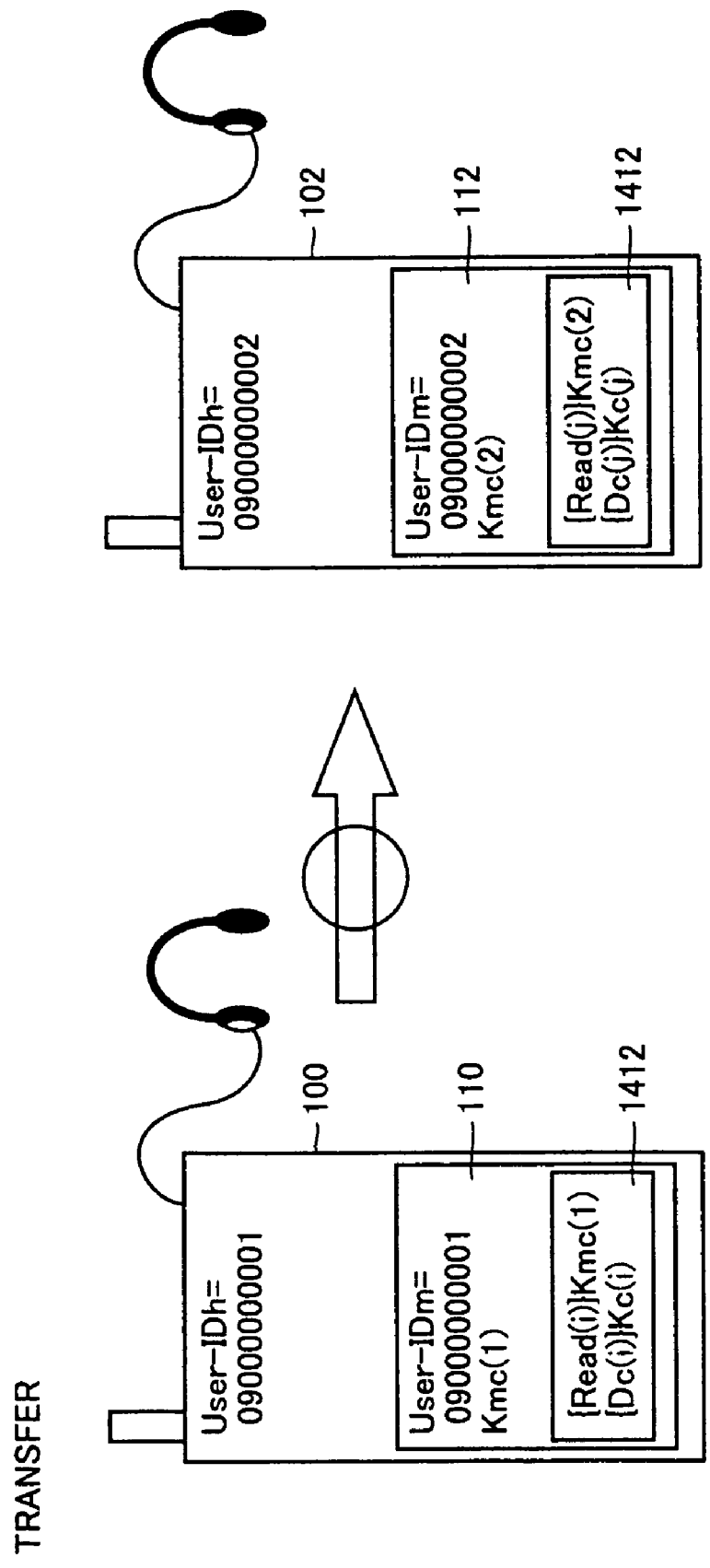
FIG. 16 shows a concept provided when two memory cards 110 and 112 are allowed to transfer reproduction information therebetween.

FIG. 16 shows a concept provided when two memory cards 110 and 112 are allowed to transfer reproduction information therebetween.

In FIG. 16, the source cellular phone 110 has memory card 110 attached thereto having user ID data User-IDm identical to user ID data User-IDh of cellular phone 100.

In this scenario, from memory card 110 to memory card 112 not only encrypted content data but also encrypted reproduction information Read(i) are allowed to be transferred and encrypted content data [Dc(i)]Kc(i) can also be reproduced by cellular phone 102. As has been described in the first embodiment, in memory card 110 at license information memory unit 1500 reproduction information is erased as both of encrypted content data and reproduction information are transferred to memory card 112.

Figure 17:
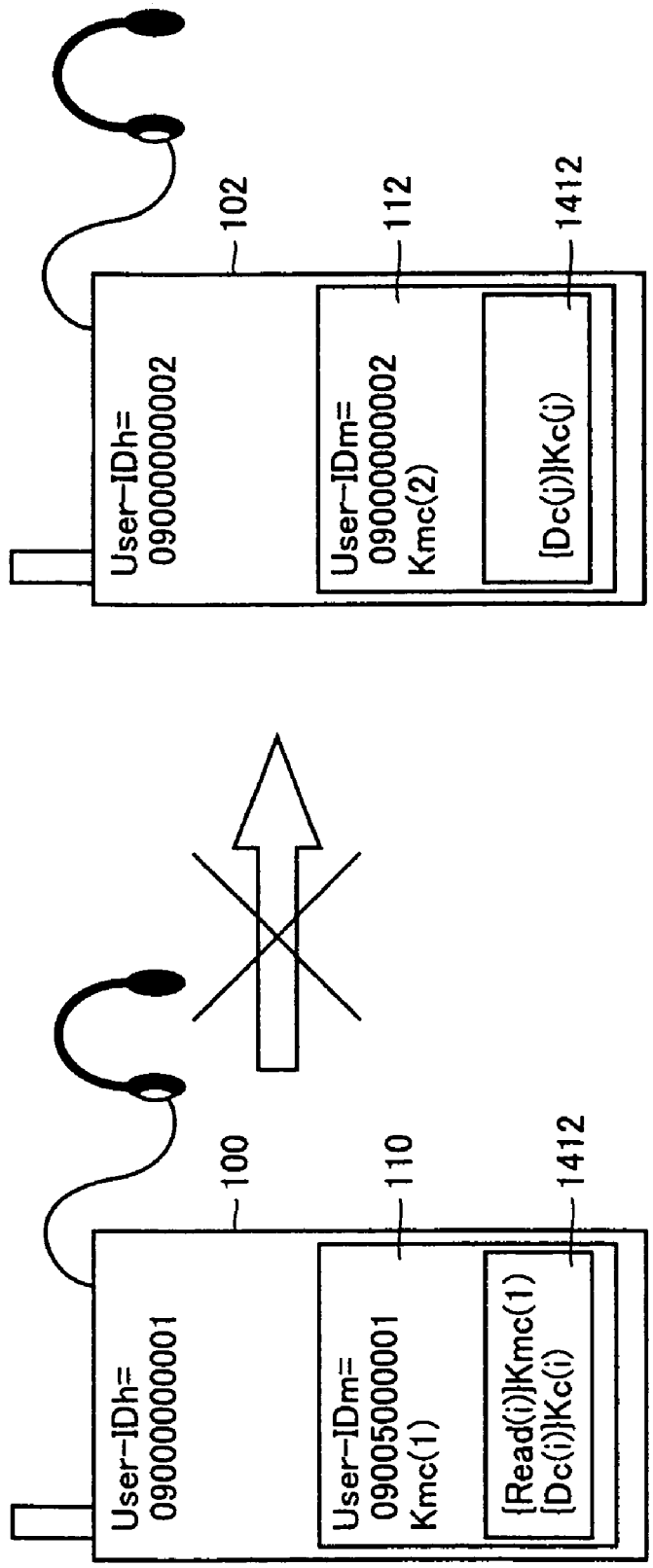
FIG. 17 shows a concept provided when memory cards 110 and 112 are disallowed to transfer reproduction information therebetween.

FIG. 17 shows a concept provided when memory card 110 is disallowed to transfer reproduction information to memory card 112.

In source cellular phone 100, user ID data User-IDm of memory card 110 and ID data User-IDh of cellular phone 100 fail to match.

As such in memory card 110 controller 1420 disallows reproduction information Read(i) in memory card 110 at memory 1412 to be transferred to memory card 112.

Thus, any unauthorized user without permission can be prohibited from transferring content data to another memory card.

The reproduction information may include a content key (a key to decrypting encrypted content data) alone or it may be a combination of a content key and license information data.

It should be noted, however, that if the reproduction information is a content key and user ID data or it is a combination of a content decryption key, license information data and user ID data, a process can be effected, as described below:

More specifically in the above description the match/mismatch of user ID data of a cellular phone and that of a memory card is based on to prohibit transfer or erasure of license information corresponding to content data.

As has been described above, if as reproduction information Read(i), that is, for each content data, user ID data User-ID(i) is stored in license information memory unit 1500 and memory 1412, then the value of user ID data User-ID(i) and that of user ID data User-IDm of a memory card and that of user ID data User-IDh of a cellular phone can be based on to determine for each content data whether reproduction information is allowed to be transferred, and processes it.

More specifically, user ID data User-ID(i) included in reproduction information recorded in a memory card, and user ID data User-IDm of the memory card and user ID data User-IDh stored in a cellular phone can have a relationship therebetween with which is controlled prohibiting transfer or erasure of license information of content data.

Figure 18:
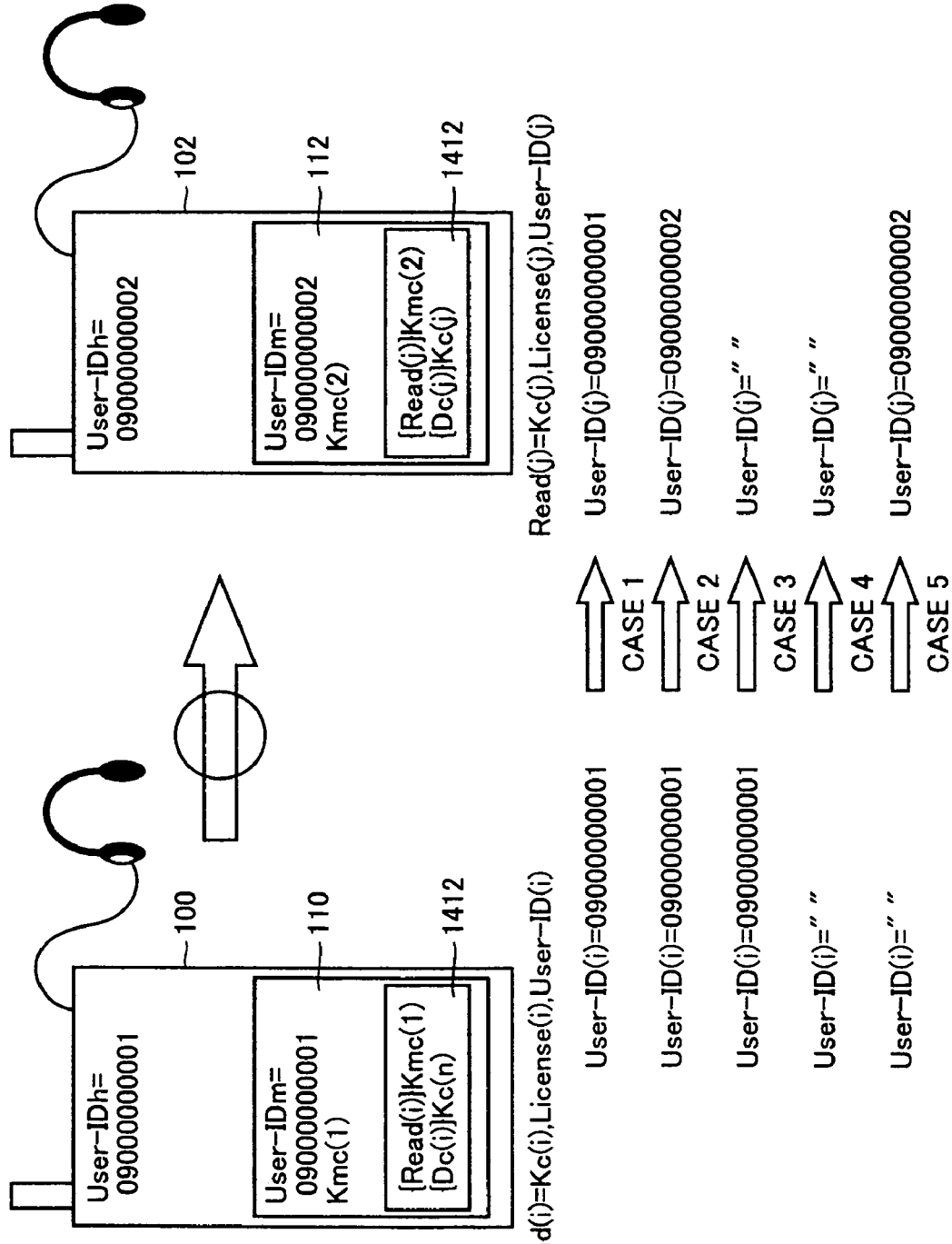
FIG. 18 shows a concept provided when reproduction information is transferred, as controlled for each content data.

FIG. 18 shows a concept provided when reproduction information is transferred, as controlled for each content data.

Note that as has been described in the first embodiment with reference to FIG. 10, if user ID data User-IDh of a cellular phone and user ID data User-IDm of a memory card are identical to user ID data User-ID(i) in user information data corresponding to content data Dc(i), rewriting user ID data User-ID(i) can cancel a restriction imposed on the user ID. Furthermore, if ID data User-ID(i) in user information data corresponding to content data Dc(i) is not stored, restriction on user ID is not effective for the sake of illustration.

In the above-described configuration after reproduction information is transferred from memory card 110 to memory card 112 there would for example be five cases, as described below:

Initially, also in FIG. 18, as well as FIG. 15, reproduction information Read(i) for ith content data Dc(i) is a combination of content decryption key Kc(i), license ID data License-ID(i) and user ID data User-ID(i) indicating a user when content data distributed is received.

Furthermore, cellular phone 100 has user ID data User-IDh of "09000000001" recorded therein and memory card 110 also holds therein user ID data User-IDm having a value of "09000000001" for the sake of illustration. Cellular phone 102 has user ID data User-IDh of "09000000002" recorded therein and memory card 112 also holds therein user ID data User-IDm having a value of "09000000002" for the sake of illustration.

Furthermore, reproduction information Read(i) is stored in memory card 110 at memory 1412 in the form of data encrypted with encryption key KPmc(1), i.e., [Read(i)]Kmc(1).

With reference to FIG. 18, initially for a first case, for memory card 110 user ID data User-ID(i) in reproduction information Read(i) corresponding to content data Dc(i) also has a value of "09000000001". In this scenario, the memory card 110 user ID data User-IDm and the cellular phone 100 user ID data User-IDh match and user ID data User-ID(i) corresponding to content data Kc(i) is also identical to them. Thus, reproduction information is allowed to be transferred, and even after it is transferred to memory card 112, reproduction information Read(j) includes user ID data User-ID (i) therein still having the value of "09000000001".

In a second case, transfer is effected as described in the first case and then in cellular phone 102 user ID data User-ID(j) in reproduction information Read(j) is set to have a value of "09000000002".

In a third case, transfer is effected as described in the first case and then in cellular phone 102 user ID data User-ID(j) in reproduction information Read(j) is erased.

In a fourth case, user ID data User-ID(i) in reproduction information Read(i) is originally not recorded. In this case, the reproduction information is allowed to be transferred without restriction imposed by user ID data User-ID(i).

A fifth case corresponds to the fourth case with a user of cellular phone 102 setting user ID data User-ID(j) in reproduction information Read(j) to be "09000000002".

Thus in any of the first to fifth cases in memory card 110 license information memory unit 1500 has reproduction information erased therefrom as encrypted content data and reproduction information are both transferred to memory card 112.

Figure 19:
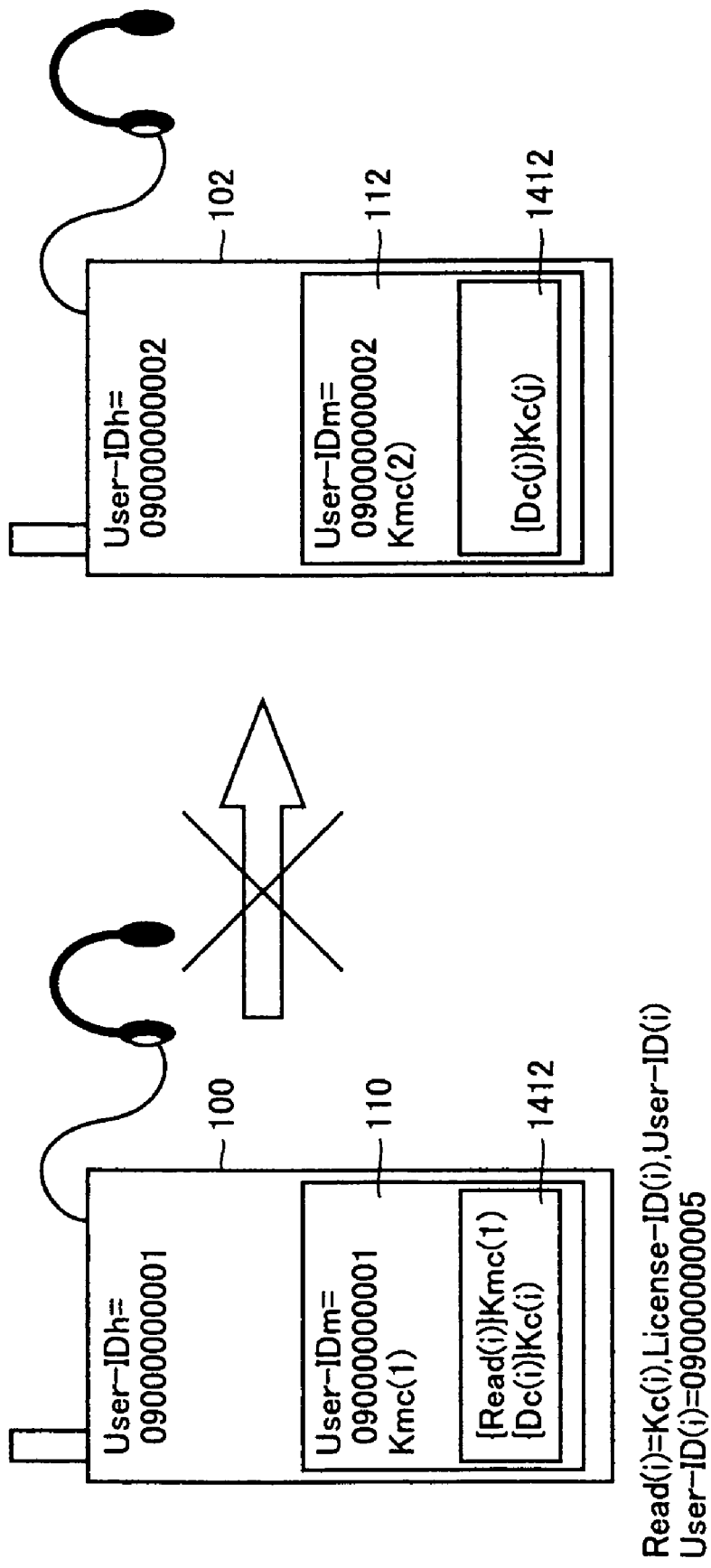
FIG. 19 shows a concept indicating when license information transfer is prohibited when reproduction information is transferred, as controlled for each content data.

In contrast, FIG. 19 shows a concept indicating when license information transfer is prohibited if reproduction information transfer is controlled for each content data.

In the source cellular phone 100, while ID data User-IDm of memory card 110 and user ID data User-IDh of cellular phone 100 match, user ID data User-IDh of cellular phone 100 and user ID data User-ID(i) in reproduction information Read(i) fail to match, and reproduction information transfer is thus prohibited.

Thus, if a memory card serving as a recording medium detachably attachable to a cellular phone has recorded therein encrypted content data and information provided to decrypt and reproduce the data any unauthorized user without permission cannot for example transfer the data.

Note that user ID data of a cellular phone can be a telephone number of the cellular phone or a nickname, a personal identification number and a combination thereof determined by the user.

The reproduction information may include a content key (a key decrypting encrypted content data) alone or it may be a combination of a content key and license ID information (information of a right related to reproduction).

Alternatively, it may be a content key and user ID data or it may be a combination of a content key, license information data and user ID data. Furthermore, any data may be added if there exist information related to reproduction.

Furthermore, also in the second embodiment, as has been described in the first embodiment with reference to FIG. 10, not only can user ID data User-IDm in a memory card but also protection information be changed.

In doing so if as has been described in the first embodiment a memory card does not have user ID data User-IDm registered therein user ID data User-IDm and protection information can be changed and encrypted content data can be reproduced in an operation without the memory card's user ID data User-IDm restricting the operation.

Note that in each embodiment described above, non-encrypted data accompanying content data, e.g., the title, singer/player, composer, lyricist and other copyright information of music data (content data), information for accessing music server 30, and other similar information can also be distributed as additional information Di together with encrypted content data. Additional data Di in distribution, transfer and replication is processed together with content data and in reproduction it is separated and accessible individually apart from music data, recorded in the same memory 1412 as encrypted content data.

Note that while in the above description the present invention has been described as a memory card the present invention is not limited thereto and more generally it is applicable to a reproduction device reproducing and outputting encrypted content data delivered, e.g., a device detachably attachable to a cellular phone and having a function communicating key data and the like required for distributing encrypted content data, and receiving and recording encrypted content data thereto.

Furthermore while in the present invention as described above a user obtains music data or other similar content data through a route on a cellular phone network or other similar information communication networks distributing the data, the present invention is also applicable for example to a recording device recording therein information sold via a content data vending machine installed on the street with a large number of content data stored therein.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A recording device detachably attachable to a reproduction apparatus reproducing and outputting encrypted content data, for receiving and recording said encrypted content data therein, comprising:
a data input/output unit allowing external data communication;
a first storage unit receiving said encrypted content data from said data input/output unit for storage;
a user information hold unit holding first user ID data provided to identify a user of said recording device;
a protection information memory unit holding protection information updatable in response to a result of comparing externally provided user information with said first user ID data, as externally instructed; and
a control unit controlling an operation of said recording device, said control unit referring to said protection information to restrict external access to said encrypted content data held in said first storage unit.

2. The device of claim 1, wherein said control unit allows said user ID data to be changed when externally provided user information and said first user ID data match.

3. The device of claim 2, wherein said control unit allows said protection information to be added and said user ID data to be added when said user information hold unit does not have said first user ID data registered therein.

4. The device of claim 1, wherein:
said protection information memory unit includes a first protection information memory unit holding first protection information included in said protection information for restriction on access to said recording device itself; and
said control unit is driven by said first protection information to prohibit additionally recording new encrypted content data in said first storage unit.

5. The device of claim 1, wherein:
said protection information memory unit includes a first protection information memory unit holding first protection information included in said protection information for restriction on access to said recording device itself; and
said control unit is driven by said first protection information to prohibit erasing new encrypted content data in said first storage unit.

6. The device of claim 5, wherein:
said protection information memory unit further includes a second protection information memory unit holding second protection information included in said protection information for restriction on access for each said encrypted content data; and
said control unit is driven by said first and second protection information to prohibit erasing encrypted content data held in said first storage unit and corresponding to said second protection information.

7. The device of claim 1, wherein:
said protection information memory unit further includes a second protection information memory unit holding second protection information included in said protection information for restriction on access for each said encrypted content data; and
said control unit is driven by said second protection information to prohibit erasing encrypted content data held in said first storage unit and corresponding to said second protection information.

8. The device of claim 6, wherein when an external instruction is received to effect an operation to reproduce said encrypted content data, said control unit controls said first storage unit and is driven by said second protection information to prohibit providing said data input/output unit with encrypted content data held in said first storage unit.

9. The device of claim 8, wherein when externally provided user information and said first user ID data match said control unit controls said first storage unit and is driven by said second protection information to prohibit providing said data input/output unit with encrypted content data held in said first storage unit.

10. The device of claim 8, wherein when said user information hold unit does not have said first user ID data registered therein said control unit controls said first storage unit and is driven by said second protection information to prohibit providing said data input/output unit with encrypted content data held in said first storage unit.

11. The device of claim 6, wherein when externally provided user information and said first user ID data match said control unit permits rewriting at least one of said first and second protection information.

12. The device of claim 6, wherein when said user information hold unit does not have said first user ID data registered therein said control unit permits rewriting at least one of said first and second protection information.

13. The device of claim 1, further comprising a second storage unit (1500) holding license information data corresponding to said encrypted content data, respectively, and required for reproducing said encrypted content data, wherein when an external instruction is received to transfer said encrypted content data held in said first storage unit, said control unit is driven by a result of comparing second user ID data externally provided for said reproduction apparatus with said first user ID data held in said user information hold unit, to control said second storage unit to provide said license information data to said data input/output unit.

14. The device of claim 1, further comprising a second storage unit holding license information data corresponding to said encrypted content data, respectively, and required for reproducing said encrypted content data, said license information each including content user ID data corresponding for each said encrypted content data, wherein an external instruction is received to transfer said encrypted content data held in said first storage unit, said control unit is driven by a result of comparing second user ID data externally provided for said reproduction apparatus, said first user ID data held in said user information hold unit and said content user ID data with each other, to control said second storage unit to provide said data input/output unit with said license information data for each said encrypted content data.

15. The device of claim 14, wherein said control unit is driven by a result of comparing second user ID data externally provided for said reproduction apparatus with said first user ID data held in said user information hold unit, to permit changing said content user ID data.

16. The device of claim 14, wherein said content user ID data is said first user ID data held in said user information hold unit when said encrypted content data corresponding thereto is distributed.

17. The device of claim 16, wherein said control unit is driven by a result of comparing second user ID data externally provided for said reproduction apparatus with said first user ID data held in said user information hold unit, to permit changing said content user ID data.

18. The device of claim 1, wherein:

said first storage unit is semiconductor memory; and said recording device is a memory card.

* * * * *